(12) United States Patent
Kondo et al.

(10) Patent No.: US 7,782,959 B2
(45) Date of Patent: Aug. 24, 2010

(54) IMAGE PROCESSING APPARATUS

(75) Inventors: Tetsujiro Kondo, Tokyo (JP); Hiroshi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1462 days.

(21) Appl. No.: 10/540,641

(22) PCT Filed: Dec. 12, 2003

(86) PCT No.: PCT/JP03/15976

§ 371 (c)(1), (2), (4) Date: Jun. 23, 2005

(87) PCT Pub. No.: WO2004/059576

PCT Pub. Date: Jul. 15, 2004

(65) Prior Publication Data

US 2006/0120628 A1    Jun. 8, 2006

(30) Foreign Application Priority Data

Dec. 25, 2002    (JP)    ............................. 2002-374862

(51) Int. Cl.
- H04B 1/66    (2006.01)
- H04N 7/12    (2006.01)
- H04N 11/02   (2006.01)
- H04N 11/04   (2006.01)

(52) U.S. Cl. ............... 375/240.26; 348/699; 348/402.1; 348/420.1; 348/416.1; 382/103; 382/307; 375/240.16

(58) Field of Classification Search ............. 375/240.26
See application file for complete search history.

(56) References Cited

U.S. PATENT DOCUMENTS

| 5,604,546 | A  | * | 2/1997 | Iwata ......................... 348/699 |
| 5,613,136 | A  | * | 3/1997 | Casavant et al. ............... 712/28 |
| 5,949,486 | A  | * | 9/1999 | Ishihara et al. ........... 348/402.1 |
| 6,122,317 | A  | * | 9/2000 | Hanami et al. ......... 375/240.16 |
| 6,366,616 | B1 | * | 4/2002 | Mizuno et al. ......... 375/240.24 |

(Continued)

FOREIGN PATENT DOCUMENTS

JP    8-161271    6/1996

(Continued)

*Primary Examiner*—Marsha D Banks Harold
*Assistant Examiner*—Jessica Roberts
(74) *Attorney, Agent, or Firm*—Frommer Lawrence & Haug LLP; William S. Frommer; Thomas F. Presson

(57) ABSTRACT

An image processing device comprising a process generation section and a plurality of series-connected operation processing units. Each of the series-connected operation processing units receives a process packet output from the process generation section and performs any processing according to an instruction contained in the process packet. The units are divided into three suites and route selection sections are respectively inserted to input side of each of the suites. If the unit which executes a process related to an input process packet is not included in the immediately following one of the suites, the respective route selection sections supply this corresponding input process packet not to the input side of that one of the suites but to the output side of that suite. The process packet moves as bypassing such a suite as not to have the unit that executes a process related to this process data, thereby reducing its processing time and its power dissipation.

9 Claims, 14 Drawing Sheets

U.S. PATENT DOCUMENTS

| | | | |
|---|---|---|---|
| 2002/0009144 A1* | 1/2002 | Ishihara et al. | 375/240.16 |
| 2002/0082716 A1* | 6/2002 | Hashimoto et al. | 700/2 |
| 2006/0110051 A1* | 5/2006 | Kondo et al. | 382/232 |

FOREIGN PATENT DOCUMENTS

| | | |
|---|---|---|
| JP | 8-171536 | 7/1996 |
| JP | 2001-283211 | 10/2001 |
| JP | 2004-80295 | 3/2004 |

\* cited by examiner

Prior Art

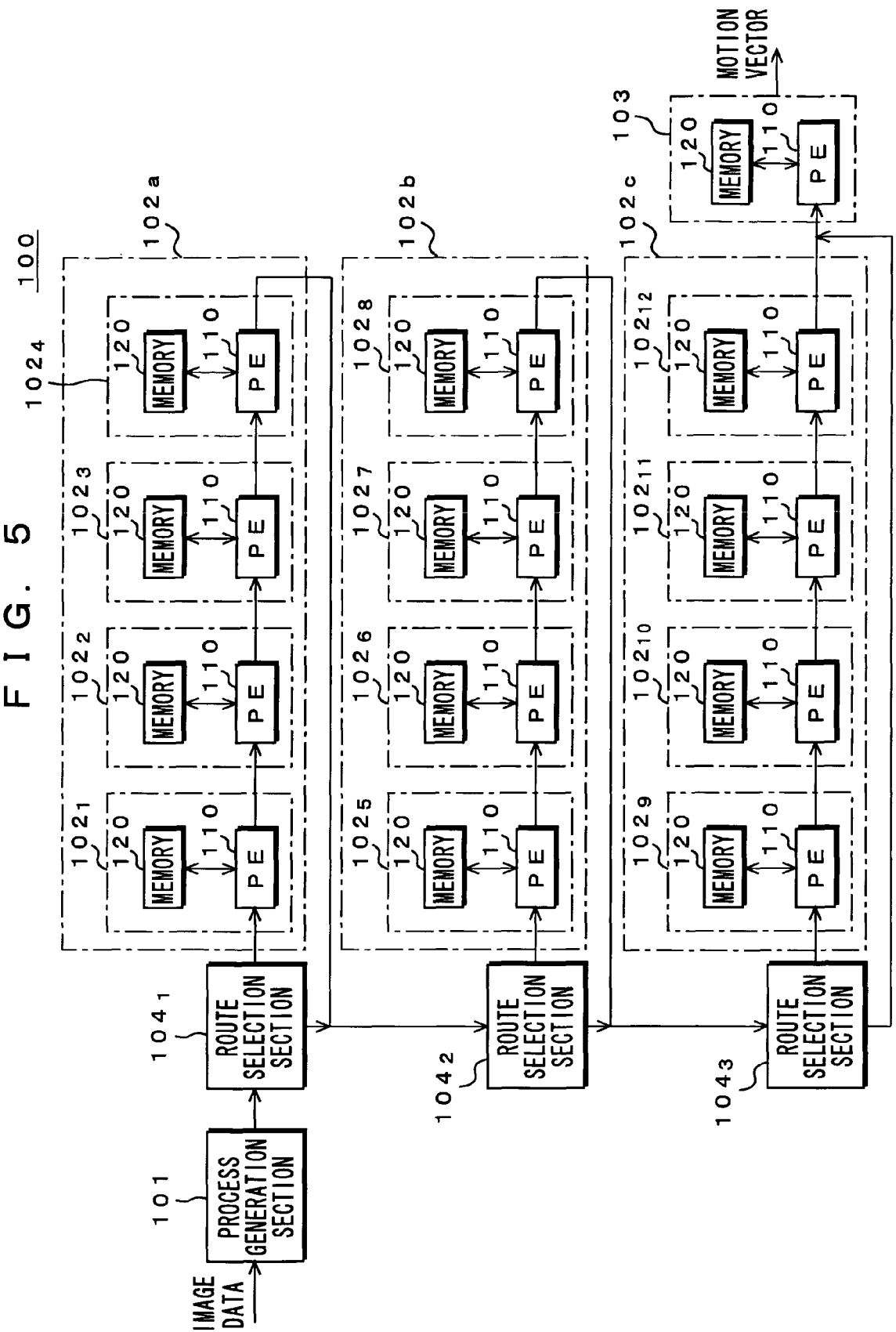

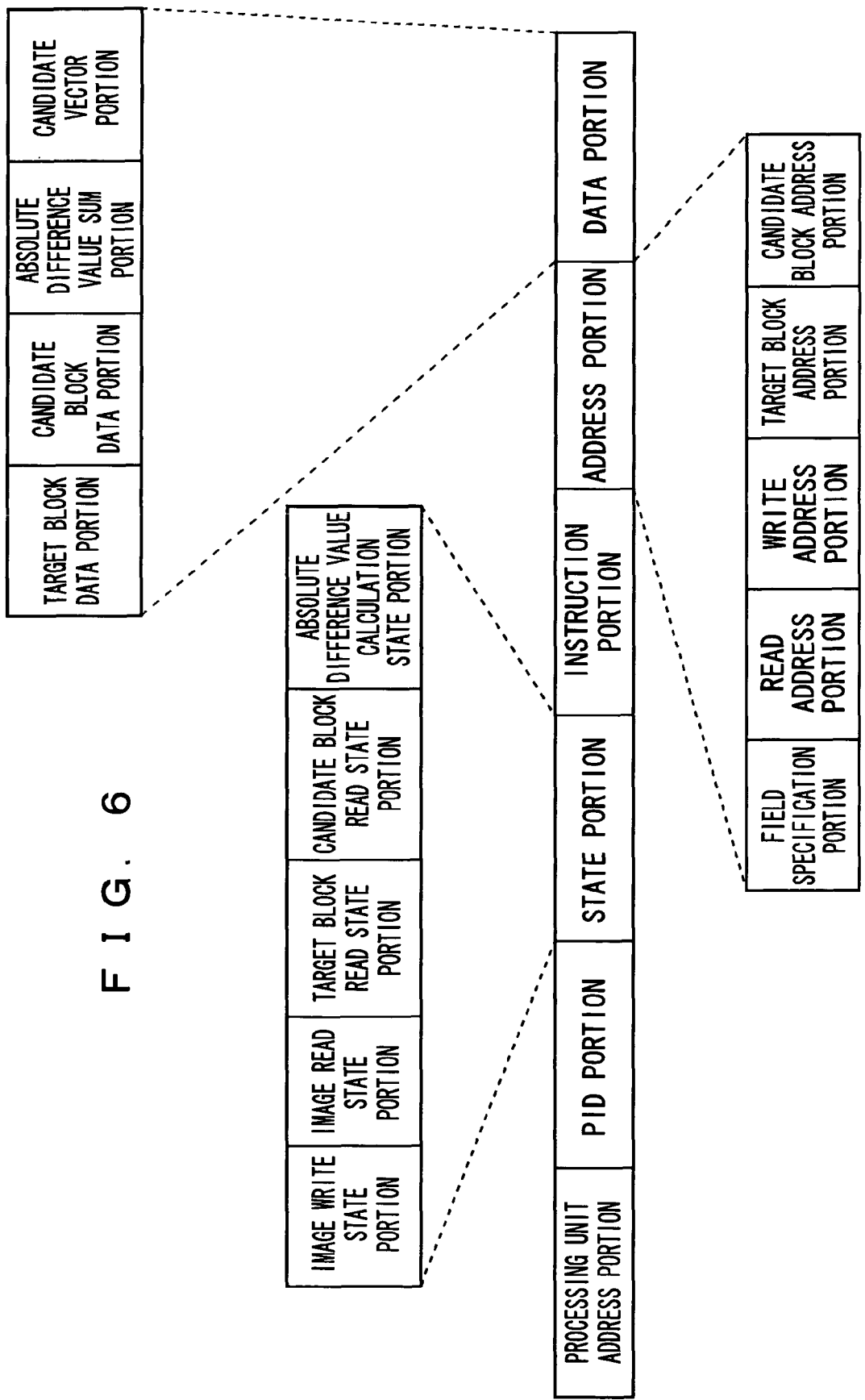

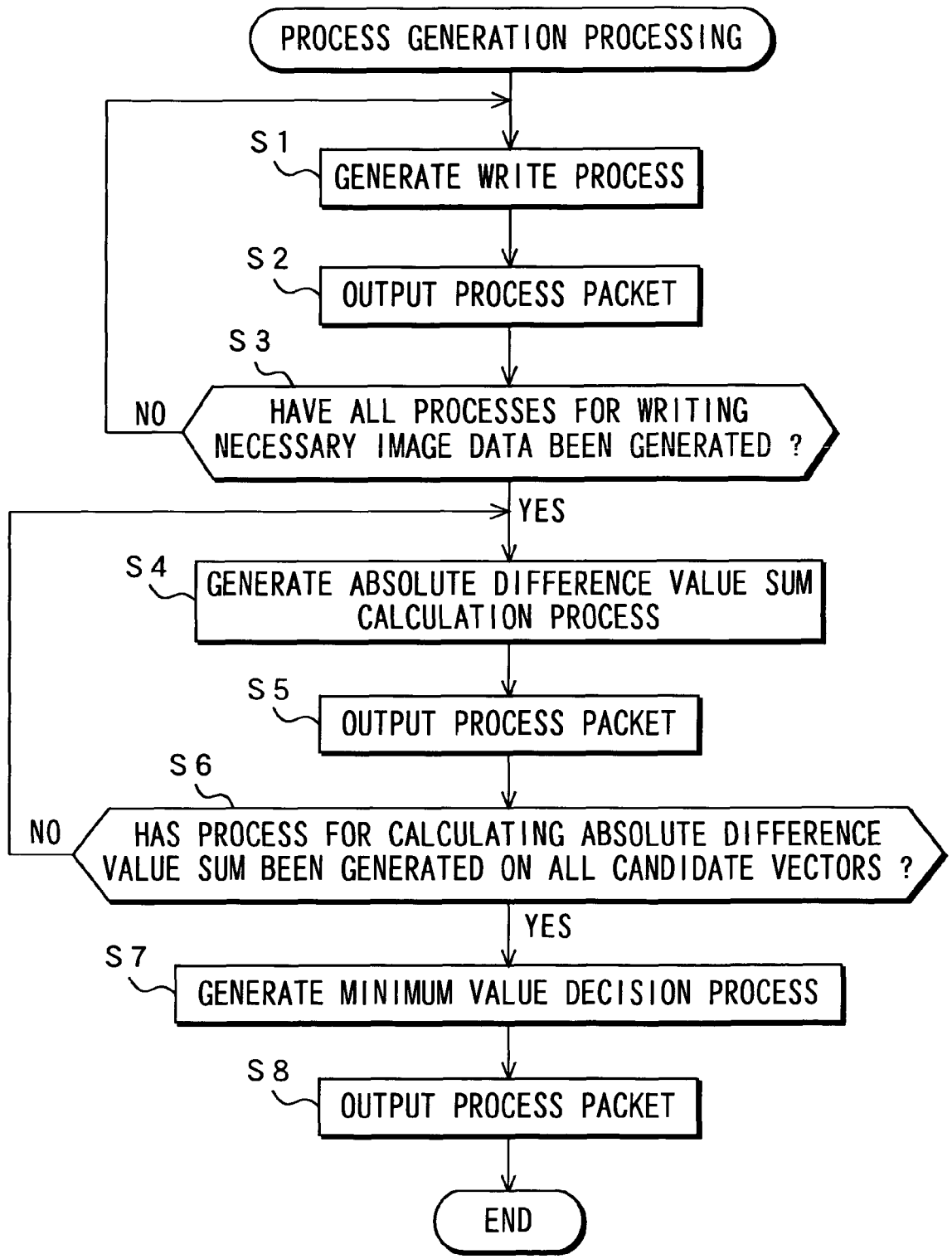

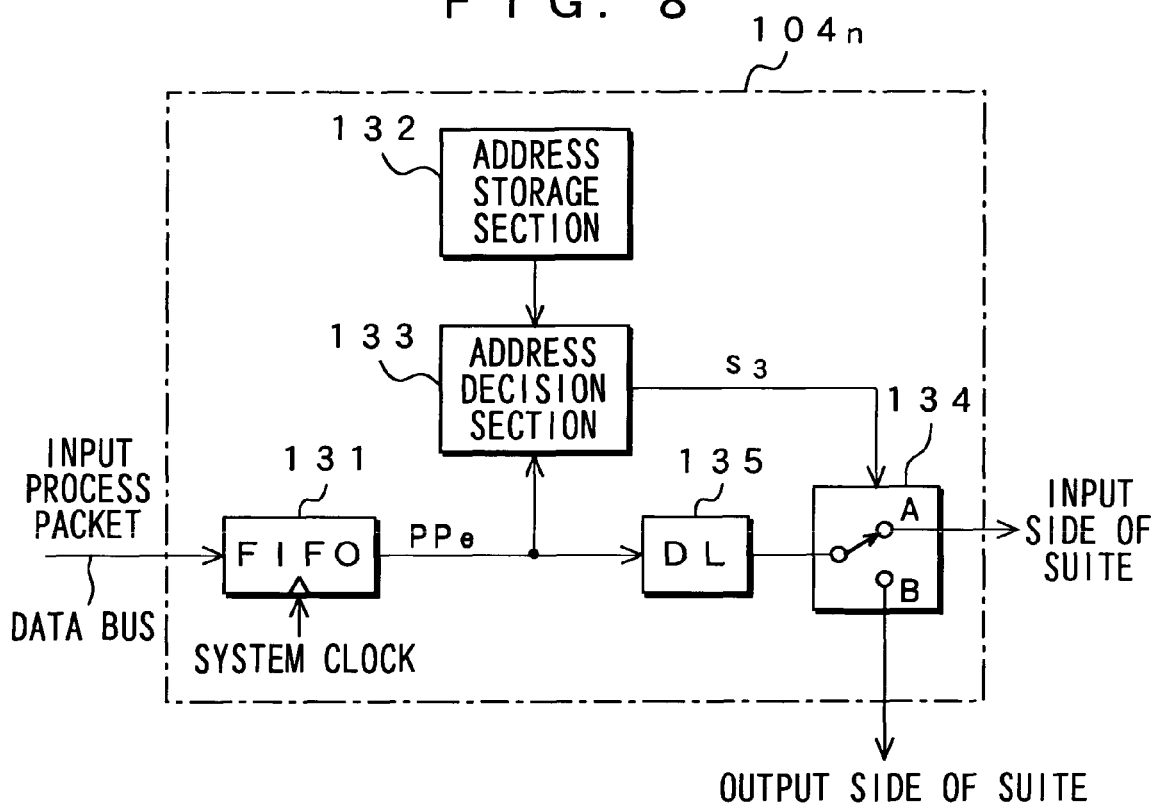

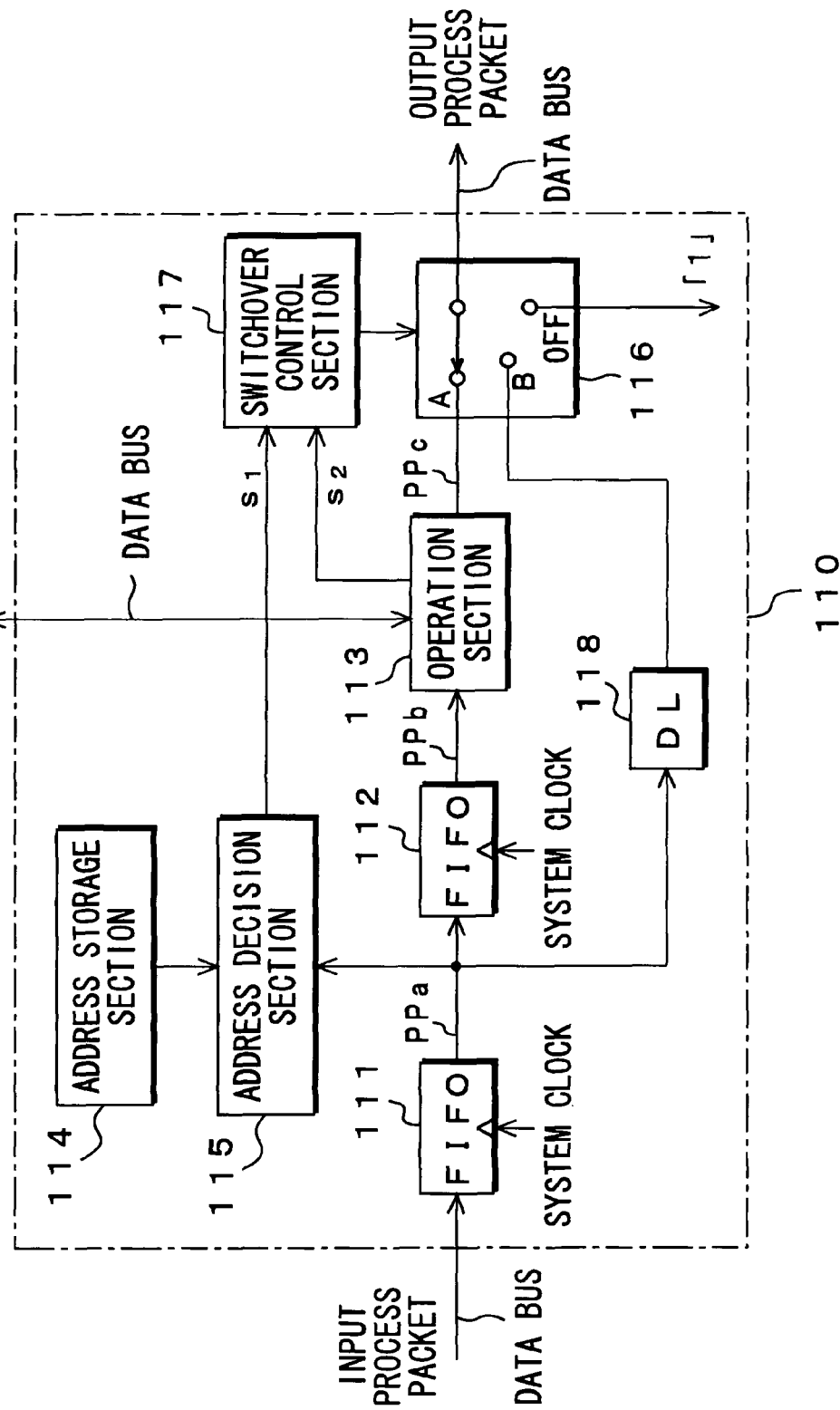

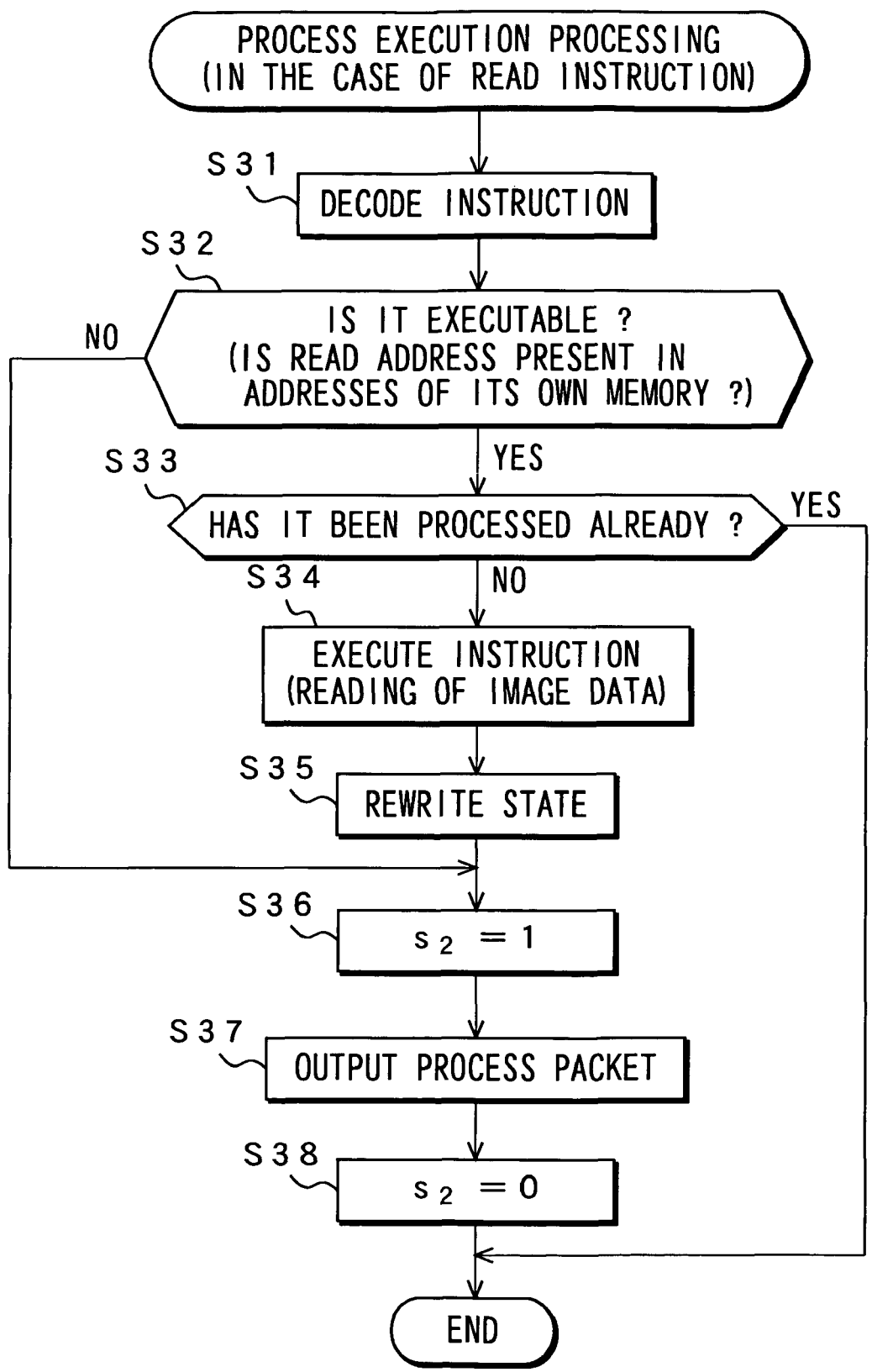

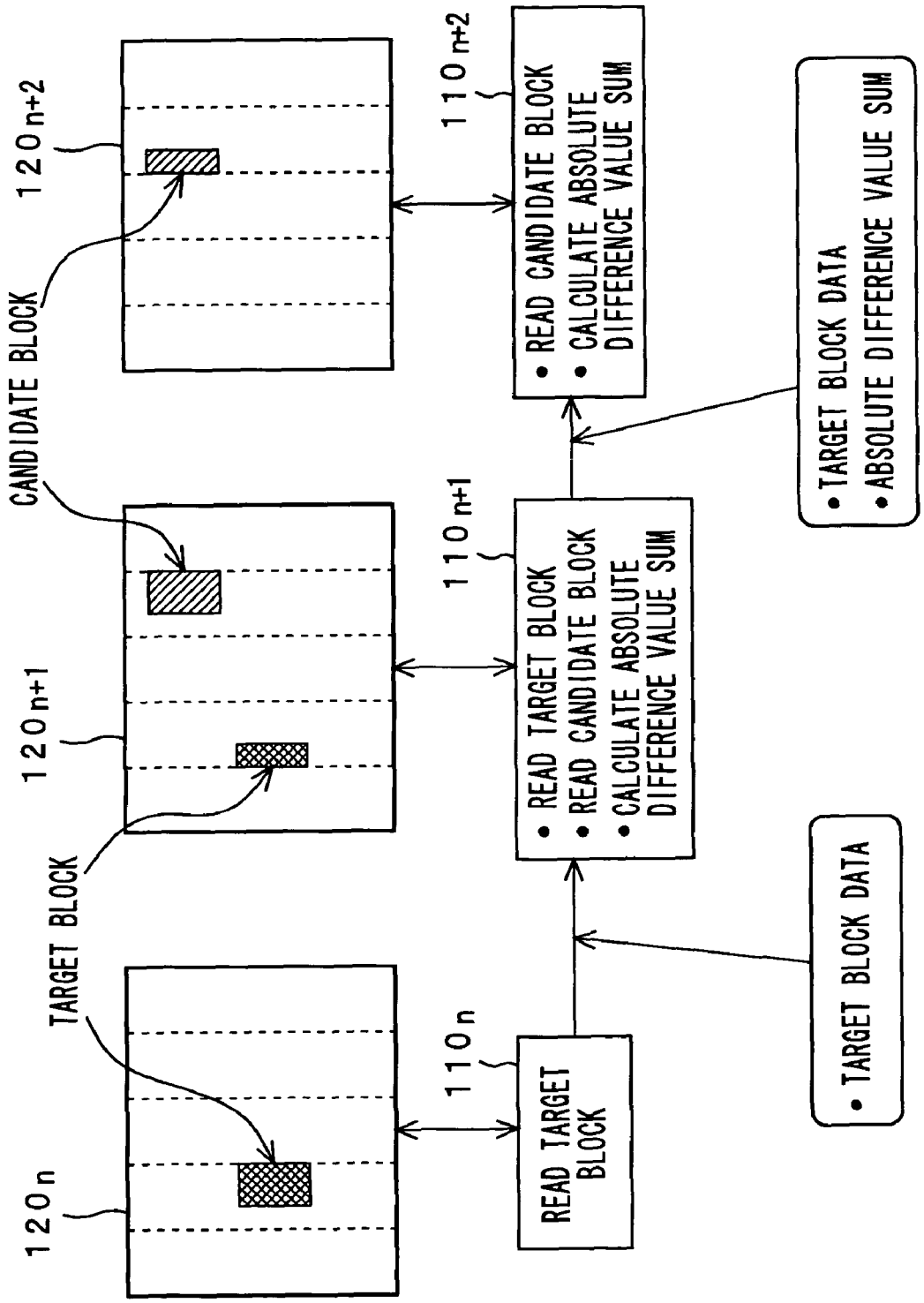

IMAGE PROCESSING APPARATUS

TECHNICAL FIELD

The present invention relates to an image processing device that could well be applied to processing of, for example, detecting a motion vector.

More specifically, the present invention relates to an image processing device for performing image processing by permitting process data containing instructions required to execute respective processes to move through a plurality of series-connected execution means for executing the processes wherein route selection means is inserted for each suite comprising a predetermined number of the consecutive execution means on the input side thereof and, when the immediately following suite of execution means executes no process related to input process data, the route selection means supplies the input process data to the output side of this immediately following suite, thereby reducing processing time and power dissipation.

The present invention relates to another image processing device for performing image processing by permitting process data containing instructions required to execute respective processes to move through a plurality of series-connected execution means for executing the processes wherein the execution means, if not to execute a process related to input process data, immediately outputs this input process data as output process data, thereby reducing processing time.

BACKGROUND ART

For example, by the moving picture experts group (MPEG) scheme for use in image coding, when a motion vector is detected in a target block of interest within blocks having a certain size, movement compensation is performed on the basis of this motion vector, to obtain a predictive image of the target block. In the MPEG scheme, a difference between each pixel in the target block and the corresponding pixel of the predictive image is then calculated and a value of the difference is encoded, thereby realizing high-efficiency compression.

As an algorithm for detecting motion vectors, a block matching method, for example, is known.

For example, as shown in FIG. 1, if it is assumed that when a block in an f'th frame is a target block and a (f+1)'th frame is a reference frame that is referenced for detection of motion vectors to detect a motion vector headed from the (f+1)'th frame to the f'th frame as a motion vector of the target block, by the block matching method, a predetermined range centered at a position of the target block in the (f+1)'th frame is set as a search range for vector search. Furthermore, from the search range in the (f+1)'th frame, a block having the same size as that of the target block is selected as a candidate block for a predictive image of the target block, to obtain difference information relating to a difference between the target block and the candidate block.

That is, for example, if the target block and the candidate block each have a size of four horizontal pixels times four vertical pixels, as shown in FIG. 2, a difference between each of the pixels of the target block and the corresponding pixel of the candidate block is obtained and hence an absolute value of this difference (absolute difference value) is also obtained. Furthermore, a total sum of those absolute difference values is obtained and for all of the candidate blocks that can be selected in the search range, a total sum of the above absolute difference values is obtained.

Then, one such (hereinafter referred to as "minimum candidate block" appropriately) of the candidate blocks that can be selected in the search range as to minimize the total sum of absolute difference values is obtained, so that a vector headed from this minimum candidate block to the target block can be obtained as a motion vector.

It is to be noted that if as the search range, a larger range than the target block and the candidate block is intended to be used and the target block and the candidate block each have four pixels times four pixels as described above, a range having a size of, for example, about 30 pixels times 30 pixels through 50 pixels times 50 pixels is used as the search range.

FIG. 3 shows a configuration of one example of a conventional motion vector detection device for obtaining a motion vector by the block matching method.

The motion vector detection device of FIG. 3 comprises an image memory 201 for storing image data and a motion vector extraction section 202 for obtaining a motion vector through calculation by use of the image data. The image memory 201 and the motion vector extraction section 202 are connected to each other via a data bus.

In the motion vector detection device having such a configuration as described above, image data of the target frame and the reference frame is stored in the image memory 201. The motion vector extraction section 202 reads the target block and the candidate block from the image memory 201 via the data bus, to obtain a total sum of absolute difference values between these target block and candidate block. The motion vector extraction section 202 further picks up such a candidate block (minimum candidate block) of those that can be selected in the search range as to minimize the total sum of the absolute difference values and obtains a vector headed from this minimum candidate block to the target block as a motion vector of the target block.

In the motion vector detection device of FIG. 3, to detect a motion vector, an amount of image data is read from the image memory 201 frequently and supplied via the data bus to the motion vector extraction section 202.

The image memory 201 for storing image data, on the other hand, is typically comprised of a plurality of memories (semiconductor memories). That is, in FIG. 3, the image memory 201 is comprised of six memories $201_1$-$201_6$.

The memories $201_1$-$201_6$ of the image memory 201 each occupy a relatively large area, so that to transfer image data from each of these memories $201_1$-$201_6$ to the motion vector extraction section 202, the data bus connecting each of the memories $201_1$-$201_6$ and the motion vector extraction section 202 needs to be relatively long. The long data bus could give rise to various problems when it is driven.

Specifically, the long data bus would give large capacitance between a wiring line of this data bus and a substrate, thus bringing about a large delay (wiring delay) in data transfer. In addition, capacitance that occurs between the wiring lines of the data bus gives rise to cross-talk between these wiring lines. Further, in recent years, semiconductor processes have gone finer and finer, so that the cross-talk between the wiring lines has become a big problem.

That is, as a spacing between wiring lines becomes smaller due to the increasingly more microlithographic semiconductor processes, impedance between the wiring lines (wiring impedance) increases; to prevent this, the wiring lines need to be thicker. If the spacing between the wiring lines becomes smaller and they become thicker, capacitance between the wiring lines becomes larger, so that cross-talk cannot be ignored.

Further, conventionally, on the wiring capacitance occurred in wiring line, it has been necessary only to take into account capacitance between the wiring lines and the substrate; moreover, since the substrate has a constant potential, the problem of the wiring capacitance has not been no significant in simulation of the image memory 201.

However, if the wiring capacitance between the wiring lines themselves increases and becomes predominant as described above, apparent capacitance of a target wiring line varies depending on how a signal transits in level on the wiring line adjacent to this target one and the wiring delay changes correspondingly, thereby making it difficult to conduct simulation.

Further, if the data bus of the image memory 201 becomes longer, disturbances become remarkable in waveforms of a signal owing to reflection by an end surface of its wiring line.

To solve this problem, such a method is available that, as shown in FIG. 4, a cache memory 203 is arranged between the image memory 201 and the motion vector extraction section 202 to make up a motion vector detection device.

In the motion vector detection device of FIG. 4, the cache memory 203 reads from the image memory 201 image data that is used frequently by the motion vector extraction section 202 to store it. The motion vector extraction section 202 uses the image data stored in the cache memory 203 to obtain a motion vector by the block matching method.

In the motion vector detection device of FIG. 4, image data transferred from the image memory 201 to the cache memory 203 and stored therein need not be read from the image memory 201, so that it is possible to mitigate the above-described problem of frequent reading of image data from the image memory 201 via the long data bus.

However, in this case, it is necessary for a redundant memory, i.e., the cache memory 203, separately from the image memory 201, which suffers from an issue of overhead.

Thus, the present applicant has earlier proposed such a configuration that process data containing instructions required to execute respective processes of motion vector detection processing may be permitted to move through a plurality of series-connected execution means to executes the image processing (see Japanese Patent Application No. 2002-236877). By this configuration, for example, a motion vector can be detected by easy-to-design hardware free from a long data bus and a cache memory.

DISCLOSURE OF THE INVENTION

It is an object of the present invention to further reduce processing time in performance of image processing wherein process data moves through a plurality of series-connected execution means that executes processes.

An image processing device according to the present invention comprises process generation means for generating processes for performing image processing that handles image data and sequentially outputting process data containing instructions required to execute each of the processes, a plurality of series-connected execution means each of which executes a process related to the process data wherein the process data contains an address of the execution means for executing the process related to the process data, and for each suite of a predetermined number of the consecutive execution means, route selection means for selecting any one of the input side and an output side of each of the suites to supply the input process data, the route selection means being inserted to an input side of each of suites, wherein the route selection means comprises first address storage means for storing an address of each of the execution means that make up the immediately following suite, first address decision means for outputs a decision signal that indicates a state if at least one of addresses stored in the first address storage means is present among addresses of the execution means that are contained in the input process data, and first switching means for supplying, depending on the decision signal output from the first address decision means, the input process data to the input side of the immediately following one of the suites if the decision signal indicates the state and, otherwise, to the output side of this immediately following one of the suites.

According to the present invention, process generation means generates processes for performing image processing that handles image data and sequentially outputs process data containing instructions required to execute these processes. The image processing is performed when this sequentially output process data moves through the plurality of series-connected execution means that executes the processes. The image processing is performed to, for example, detect a motion vector.

The plurality of execution means is divided into suites each of which comprises a predetermined number of the consecutive execution means. The route selection means for selecting an input side or an output side of this suite and supplying the input process data to either one is inserted into an input side of each of the suites.

The route selection means has first address storage means for storing an address of each of the execution means of the immediately following suite. Further, the process data contains an address of the execution means that executes a process related to this process data.

If at least one of addresses stored in the address storage means is present among addresses of the execution means that are contained in the input process data, the route selection means supplies the input process data to the input side of the immediately following suite and, otherwise, to the output side thereof.

The process data thus moves as bypassing such a suite as not to have the execution means that execute a process related to this process data, thereby reducing its processing time. Further, the process data does not move uselessly, thereby reducing its power dissipation.

An image processing device according to the present invention comprises process generation means for generating processes for performing image processing that handles image data and sequentially outputting process data containing instructions required to execute each of the processes, and a plurality of series-connected execution means each of which executes a process related to the process data wherein the process data contains an address of the execution means for executing the process related to the process data, wherein each of the plurality of execution means comprises processing means for performing processing of image data in accordance with the instructions contained in the input process data, altering the input process data to obtain process data to be output based on a result of the processing, and outputting a request signal that indicates a state when the process data to be output is output, address storage means for storing an address of itself, address decision means for outputting a decision signal that indicates a state if the address of itself stored in the address storage means is present among the addresses of the execution means contained in the input process data, and switching means for outputting, depending on the decision signal output from the address decision means and the request signal output from the processing means, the process data to be output obtained by the processing means as output process data if the request signal is the state, and the input process data as the output process data if the request signal is not the state and the decision signal is not the state.

In the present invention, the process generation means generates processes for performing image processing that handles image data and sequentially outputs process data containing instructions required to execute these processes. The image processing is performed when this sequentially output process data moves through the plurality of series-connected execution means that executes the processes. The process data contains an address of the execution means that executes a process related to this process data.

Each of the plurality of execution means further has data storage means for storing, for example, image data, to perform as image data processing any one of writing of image data to the data storage means, reading of the image data from the data storage means, and calculation of a difference on the image data. Image processing is performed to detect, for example, a motion vector.

Each of the plurality of execution means has processing means, address storage means, address decision means, and switching means. The processing means processes image data in accordance with instructions contained in input process data and alters the input process data to obtain process data to be output based on a result of this processing and also output a request signal that indicates a state when this process data to be output is output. The address decision means outputs a decision signal that indicates a state if the address of itself stored in the address storage means is present among the addresses of the execution means contained in the input process data.

The switching means outputs as output process data the process data to be output that has been obtained by the processing means if the request signal indicates the state and outputs the input process data as the output process data if the request signal does not indicate the state and the decision signal does not indicate the state.

With this, the process data, if inputting it to any execution means that does not execute a process related to it, directly moves to the following execution means, thereby reducing processing time.

It is to be noted that the switching means may output high-level data or low-level data if the request signal does not indicate the state and the decision signal indicates the state. In this case, a process related to process data input to execution means is executed by this execution means. In a case where the input process data is not supplied to the following stage and in a condition where process data to be output from the processing means is not supplied to the following stage, high-level data or low-level data is output, thereby preventing wrong process data from being supplied to the following stage.

BRIEF DESCRIPTION OF THE DRAWINGS

FIG. 5 is a block diagram for showing a configuration of a motion vector detection device according to an embodiment;

FIG. 6 is a diagram for showing a format of a process packet;

FIG. 7 is an explanatory flowchart for showing process generation processing;

FIG. 8 is a block diagram for showing a configuration of a route selection section;

FIG. 9 is a block diagram for showing a configuration of an operation processing unit;

FIG. 10 is a diagram for showing switchover relationships among a decision signal $s_1$, a request signal $s_2$, and a transfer switch;

FIG. 14 is an explanatory flowchart of the process execution processing (in the case of a read instruction) by the operation section;

FIG. 16 is an explanatory diagram of processing by an operation processing unit.

BEST MADE FOR CARRYING OUT THE INVENTION

Figure 1:
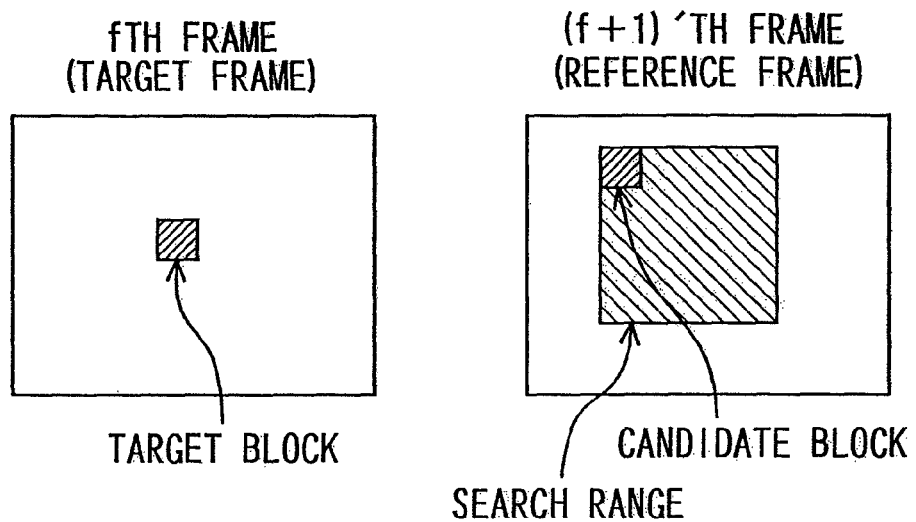
FIG. 1 is an explanatory diagram of a block matching method.
Figure 2:
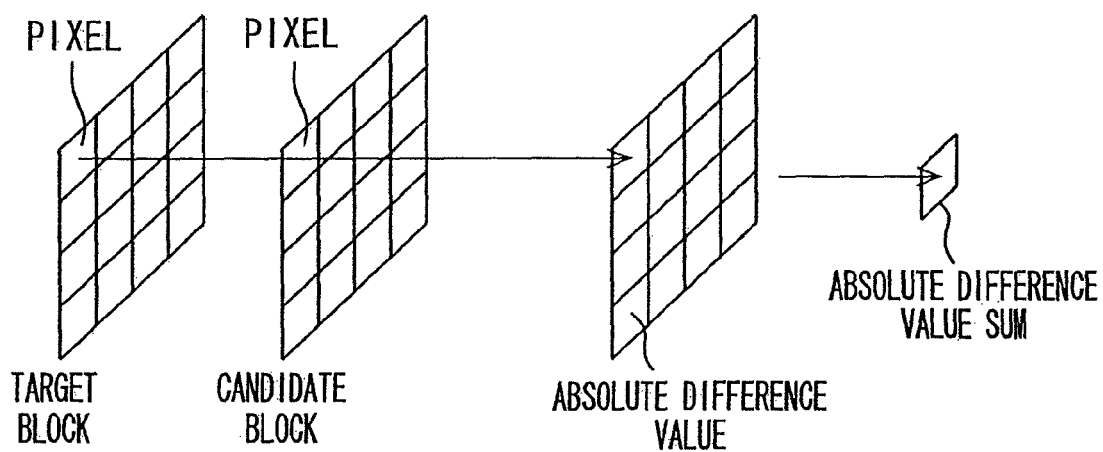
FIG. 2 is another explanatory diagram of the block matching method.

The following will describe embodiments of the present invention with reference to drawings.

FIG. 5 shows a configuration of a motion vector detection device 100 according to an embodiment. In this motion vector detection device 100, a motion vector is detected by the above-described block matching method.

This motion vector detection device 100 has a process generation section 101. This process generation section 101 generates processes required to perform processing of detecting a motion vector and sequentially outputs process packets (process data), which include instructions that execute these processes. This process generation section 101 is supplied with image data for which the motion vector is detected. The process generation section 101 puts that image data also in a process packet as necessary.

Further, the motion vector detection device 100 has plural series-connected operation processing units, in this case, 12 units $102_1$-$102_{12}$ each for executing a process in accordance with a process packet. Each of the operation processing units $102_1$-$102_{12}$ makes up execution means. These 12 operation processing units $102_1$-$102_{12}$ are connected as the following stage of the process generation section 101.

The operation processing unit $102_n$ (n=1 through 12) receives a process packet supplied from its preceding-stage operation processing unit $102_{n-1}$ (or a route selection section), to perform processing in accordance with instructions contained in this process packet. Further, the operation processing unit $102_n$, as necessary, puts results of that processing in a process packet and supplies it to the following-stage operation processing unit $102_{n+1}$ (or the route selection section or an add-up section). In such a manner, the last-stage operation processing unit $102_{12}$ outputs a process packet in which a total sum of absolute difference values between a target block and given candidate blocks is placed, which will be described later. The route selection section and the add-up section will be described later.

Further, the motion vector detection device 100 has three route selection sections $104_1$-$104_3$. The above-described 12 operation processing units $102_1$-$102_{12}$ are divided into suites each of which comprises the consecutive four operation processing units. That is, they are divided into a suite 102a comprising the units $102_1$-$102_4$, a suite 102b comprising the units $102_5$-$102_8$, and a suite 102c comprising the units $102_9$-$102_{12}$. The above-described three route selection sections $104_1$-$104_3$ are inserted on the input sides of the suites 102a-10c, respectively. It is to be noted that the number of the suites need not be three and the number of the operation processing units $102_n$ that make up each suite need not be the same.

Each of the route selection sections $104_1$-$104_3$ supplies an input process packet selectively either to the input side or the output side of the immediately following suites 102a-102c, respectively. That is, if the operation processing unit $102_n$ that executes a process related to this input process packet is present in any of the immediately following suites 102a-102c, each of the route selection sections $104_1$-$104_3$ supplies an input process packet to an input side of the suite and, otherwise, supplies the input process packet to an output side of the suite, respectively.

Further, the motion vector detection device 100 has an add-up section 103. This add-up section 103 is connected to the output side of the last-stage operation processing unit $102_{12}$, to obtain a motion vector from a total sum, allocated to a process packet output from this operation processing unit $102_{12}$, of absolute difference values between the target block and the candidate blocks and outputs this motion vector.

The following will describe a format of a process packet that is output from the above-described process generation portion 101 and moves through the operation processing units $102_1$-$102_{12}$. FIG. 6 shows a format example of a process packet.

For example, the process packet is comprised of, from its top, a processing unit address portion, a process identification (PID) portion, a state portion, an instruction portion, an address portion, and a data portion sequentially.

To the processing unit address portion, addresses of one or a plurality of operation processing units that executes a process related to the relevant process packet are allocated.

To the PID portion, a PID is allocated. It is to be noted that as the PID, any information may be employed as far as it can identify individual processes to be performed during a process of obtaining a motion vector of a target block. That is, it is possible to employ as the PIS, for example, combinations each of an address that indicates a location of the target block and each of the addresses that indicate locations of the candidate blocks.

Further, in a case where the candidate blocks that correspond to the target block are given number information such as serial numbers, this number information can be employed as the PID. It is to be noted that if the number information is employed as the PID, allocating process packets of all the serial numbers in the add-up section 103 allows to be recognized a total sum of absolute difference value sums between a given target block and all candidate blocks that can be selected in a search range.

The state portion is comprised of, for example, an image write state portion, an image read state portion, a target block read state portion, a candidate block read state portion, and an absolute difference value operation state portion.

In the image write state portion, any one of state information "not-yet-to-be-done" indicating that given image data has not yet been written into a memory 120 of a later-described operation processing unit $102_n$, state information "under-way" indicating that the image data is being written thereinto, and state information "completed" indicating that the image data has been written completely thereinto is set.

That is, for example, considering a case where given image data is divided and written into two memories such as a memory $120_i$ of the operation processing unit $102_i$ and a memory $120_j$ of the operation processing unit $102_j$ with memory $120_n$ standing for any memories 120 that makes up the operation processing unit $102_n$, if the image data is written neither into the memory $120_i$ nor into the memory $120_j$, the state information "not-yet-to-be-done" is set to the image write state portion. Further, if image data is written into only one of the memories $120_i$ and $120_j$, the state information "under-way" is set to the image write state portion. Furthermore, if image data is written into both of the memories $120_i$ and $120_j$, the state information "completed" is set to the image write state portion.

It is to be noted that the state information set to the state portion plays the role of a message that informs the operation processing unit $102_n$ how state such as write state of image data occurs.

In the image read state portion, any one of state information "not-yet-to-be-done" indicating that given image data has not yet been read from the memory 120, state information "under-way" indicating the image data is being read therefrom, and state information "completed" indicating that the image data has been read completely therefrom is set.

In the target block read state portion, any one of state information "not-yet-to-be-done" indicating that target-block image data has not yet been read from the memory 120, state information "under-way" indicating that the target-block image data is being read therefrom, and state information "completed" indicating that the target-block image data has been read completely therefrom is set.

In the candidate block read state portion, any one of state information "not-yet-to-be-done" indicating that candidate-block image data has not yet been read from the memory 120, state information "under-way" indicating that the candidate-block image data is being read therefrom, and state information "completed" indicating that the candidate-block image data has been read completely therefrom is set.

In the absolute difference value operation state portion, any one of state information "not-yet-to-be-done" indicating that a total sum of absolute difference values (absolute difference value sum) between a given target block and candidate blocks has not yet been calculated, state information "under-way" indicating that the absolute difference value sum is being calculated, and state information "completed" indicating that the absolute difference value sum has been calculated completely is set.

It is to be noted that the state information is made up of, for example, two bits, so that "not-yet-to-be-done", "under-way", and "completed" are assigned "11", "10", and "00", respectively.

In the instruction portion, an instruction indicating processing to be performed is set. As the instructions, for example, at least four instructions are prepared: a write instruction that instructs to write image data to, for example, the memory 120; a read instruction that instructs to read image data from the memory 120; an absolute difference value sum operation instruction that instructs to calculate an absolute difference value sum between a target block and candidate blocks; and a minimum value determination instruction that instructs to determine a minimum value among absolute difference value sums obtained for candidate blocks and, based on this minimum value, obtain a motion block of a target block.

If the instructions are those four (=2²) instructions of the write instruction, the read instruction, the absolute difference value sum operation instruction, and the minimum value determination instruction, the instruction portion only needs to have two bits. However, preferably the instruction portion has more bits, for example, four bits taking into account possible future expansion in types of the instructions.

The address portion is made up of a field specification portion, a read address portion, a write address portion, a target block address portion, and a candidate block address portion.

In the field specification portion, field information that indicates a field of a candidate block is set. That is, in the present embodiment, as described later, image data of five fields is stored in the memory 120 of the operation processing unit 102$_n$, and among the image data stored in this memory 120, field information that indicates a field in which a candidate block is present is set into the field specification portion. It is to be noted that if storing image data of five fields, the field information only needs to have three bits but preferably it has more bits, for example, four bits taking into account possible future expansion.

To the read address portion, if reading the image data from the memory 120, that is, a read instruction is set into the instruction portion, an address of the memory 120 from which image data is read is allocated.

To the write address portion, if the image data is written into the memory 120, that is, a write instruction is set into the instruction portion, an address of the memory 120 to which image data is written is allocated.

To the target block address portion, an address of a target block is allocated. It is to be noted that as the address of the target block, for example, positional information can be employed which indicates a position of a pixel at the left top corner in the target block in a field (target field) of the target block. Therefore, for example, if one field is made up of 720×240 pixels and a target block is made up of 4×2 pixels, 21600 (=720/4×240/2) target block addresses may be considered, so that the target block address can be represented using 15 bits.

To the candidate block address portion, an address of a candidate block is allocated. It is to be noted that as the candidate block address, for example, positional information can be employed which indicate a position of a pixel at the left top corner in the candidate block in a field (reference field) of the candidate block. Therefore, for example, if one field is made up of 720×240 pixels, 1782800 (=720×240) candidate block addresses may be considered, so that the candidate block address can be represented using 18 bits.

The data portion is made up of a target block data portion, a candidate block data portion, an absolute difference value sum portion, and a candidate vector portion.

To the target block data portion, image data of a target block, that is, pixels (value of pixels) that make up the target block is allocated. Therefore, for example, if a target block is made up of 4×2 pixels and each of the pixels is assigned, for example, eight bits as described above, the target block data portion is made up of 64 (=4×2×8) bits.

To the candidate block data portion, pixel data of a candidate block, that is, pixels that make up the candidate block is allocated. Therefore, for example, if a candidate block is made up of the same 4×2 pixels as the target block as described above and each pixel is assigned, for example, eight bits, the candidate block data portion is made up of 64 (=4× 2×8) bits similar to the target block data portion.

To the absolute difference value sum portion, an absolute difference value sum between a target block and each of the candidate blocks is allocated. If, for example, each pixel is assigned eight bits, as described above, an absolute difference value between a given pixel in the target block and the corresponding pixel in any of the candidate blocks is represented using nine bits.

To the candidate vector portion, a vector headed from a candidate block to a target block as a candidate of a motion vector (candidate vector) of the target block is allocated. It is to be noted that the candidate vector can be obtained from an address of a target block allocated to the target block address portion and an address of a candidate block allocated to the target block address portion. Further, for example, if a search range is made up of 63×63 pixels or less, an x-directional (horizontal) component and a y-directional (vertical) component of a candidate vector can both be represented using six bits, so that the candidate vector portion can be made up of 12 (=6+6) bits.

The following will describe processing (process generation processing), with reference to the flowchart in FIG. 7, to be performed in order to allow the above-described process generation portion 101 to detect a motion vector of a target block if one block is assumed to be the target block.

First, as step S1, the process generation section 101 generates some or all of write processes to write at least to the memory 120 image data of a target block in a target field in which a target block is present and image data of a search range in a reference field in which a candidate block is present, and generates a process packet containing write instructions that execute those write processes, and the process goes to step S2.

It is to be noted that the process generation section 101, at step S1, allocates the write instructions to the instruction portion in such a process packet as shown in FIG. 6 as well as allocates the pixel data of the target block and that of the candidate block to be written into the memory 120 to the target block data portion and the candidate block data portion, respectively, and also allocates an address of the memory 120 into which that image data is to be written to the write address portion.

Further, the process generation section 101 allocates addresses of one or a plurality of operation processing units 102$_n$ which executes those write processes, to the processing unit address portion. Furthermore, the process generation section 101 allocates state information to the state portion in the process packet as necessary.

At step S2, the process generation portion 101 outputs the process packet generated by the previous step S1 and the process goes to step S3.

At step S3, the process generation section 101 decides whether the processes are all generated which are required to write at least into the memory 120 necessary image data, that is, in this case, the image data of the target block and the image data of the search range in the reference field in which the candidate block is present. If having decided at step S3 that not all of these processes for writing the necessary image data into the memory 120 are yet generated, the process returns to step S1 where the process generation section 101 generates a process of writing into the memory 120 image data, which has not yet been written, of those of writing the necessary image data into it and then repeats the same processing.

Further, if the process generation section 101 decides at step S3 that the processes of writing the necessary image data into the memory 120 have all generated, the process goes to step S4. At step S4, the process generation section 101 generates an absolute difference value sum calculation process of obtaining an absolute difference value sum, as for a vector (candidate block) headed from a given one of the candidate blocks selectable in the search range to the target block, between the target block and the candidate block, and generates a process packet containing absolute difference value sum calculation instructions that execute this absolute difference value sum calculation process, and the process goes to step S5.

It is to be noted that at step S4 the process generation section 101 allocates the absolute difference value sum calculation instructions to the instruction portion in such a process packet as shown in FIG. 6 as well as allocates addresses of the target block and the candidate blocks written into the memory 120 to the target block address portion and the candidate block address portion respectively and also allocates the candidate vector to the candidate vector portion.

Further, the process generation section 101 allocates addresses of one or a plurality of operation processing units $102n$ which executes that absolute difference value sum calculation process, to the processing unit address portion. Furthermore, the process generation section 101 allocates field information that indicates a field of the candidate block to the field specification portion and also, as necessary, allocates the state information to the state portion in the process packet.

At step S5, the process generation portion 101 outputs the process packet generated by the previous step S4 and the process goes to step S6.

At step S6, the process generation section 101 decides whether the absolute difference value sum calculation process for calculating an absolute difference value sum is generated for all of the candidate vectors selectable in the search range for the target block.

If having decided at step S6 that the absolute difference value sum calculation process for calculating the absolute difference value sum has not yet been generated for all of the candidate blocks selectable in the search range for the target block, the process returns to step S4 where the process generation section 101 generates an absolute difference value sum calculation process for calculating an absolute difference value sum for those candidate blocks for which no absolute difference value sum calculation process has been generated and then repeats the same processing.

Further, if the process generation section 101 has decided at step S6 that the absolute difference value sum calculation process of calculating the absolute difference value sum is generated for all of the candidate vectors selectable in the search range for the target block, the process goes to step S7.

At step S7, the process generation section 101 determines a minimum value among absolute difference value sums obtained for all of the candidate vectors selectable in the search range for the target block, generates a minimum value decision process for obtaining a motion vector of the target block based on the minimum value, and generates a process packet containing a minimum value decision instruction for executing that minimum value decision process, and the process goes to step S8.

At step S8, the process generation section 101 outputs the process packet generated at step S7 and then the process ends processing.

In the vector detection device 100 shown in FIG. 5, as described above, the process generation section 101 generates processes for performing processing to detect motion vectors and sequentially outputs process packets containing instructions that execute these processes. These process packets each move through the operation processing units $102_1$-$102_{12}$, which in turn sequentially execute these processes for detection of the motion vector.

Finally, the process packet to which an absolute difference value sum for each of the candidate vectors selectable in the search range for the target block is allocated is received by the add-up section 103. The add-up section 103, when having received the process packet containing the minimum value decision instruction, selects one such of the process packets that correspond to the absolute difference value sum calculation processes as to be allocated the minimum absolute difference value sum and outputs a candidate vector allocated to this process packet as a motion vector of the target block.

It is to be noted that in the present embodiment, the process packets output from the process generation section 101 do not move through all of the operation processing units $102_1$-$102_{12}$. The process packets appropriately bypass some of these units in accordance with the route selection sections $104_1$-$104_3$.

That is, if the operation processing unit $102_n$ which executes a process related to an input process packet is not included in the immediately following one of any suites $102a$-$102c$, the corresponding one of the route selection sections $104_1$-$104_3$ supplies this input process packet not to the input side of that one of the suites $102a$-$102c$ but to the output side of that suite. In such a manner, the process packet moves through as bypassing such suites as not to include the operation processing unit $102_n$ that executes the process related to that process packet, thereby reducing processing time; moreover, useless movement of the process packet can be eliminated, thus reducing power dissipation.

The following will describes in detail the route selection section $104_n$ (n=1 through 3). FIG. 8 shows a configuration of the route selection section $104_n$.

This route selection section $104_n$ has a first-in, first-out (FIFO) memory 131. This FIFO memory 131 holds a process packet (input process packet) supplied via the data bus from the previous-stage process generation section 101 (or route selection section or operation processing unit). This FIFO memory 131 takes in an input process packet as synchronized with a system clock signal supplied thereto and stores it temporarily.

The route selection section $104_n$ further has an address storage section 132 and an address decision section 133. The address storage section 132 stores beforehand addresses of all the operation processing units $102_n$ that are included in the immediately following suite. For example, as for the route selection section $104_1$, the addresses of the operation processing units $102_1$-$102_4$ that are included in the immediately following suite $102a$ are stored in the address storage section 132. This holds true also with the route selection sections $104_2$ and $104_3$.

The address decision section 133 decides whether a process related to a process packet PPe which is output from the FIFO memory 131 is to be executed by any one of the operation processing units $102_n$ included in a suite that immediately follows this route selection section $104_n$.

That is, the address decision section 133 decides whether at least one of addresses stored in the address storage section 132 is present in one or a plurality of addresses stored in the processing unit address portion (see FIG. 6) in an process packet PPe output from the FIFO memory 131 and outputs a decision signal $s_3$ that becomes a state, "1", for example, if present and, otherwise, the other state, "0", for example.

The route selection section $104_n$ further has a transfer switch 134 as switching means. This transfer switch 134 selectively supplies a process packet PPe output from the FIFO memory 131 to the input side or the output side of the suite that immediately follows the relevant route selection section $104_n$, based on the decision signal $s_3$. This transfer switch 134 is connected to an A-side if the decision signal $s_3$ is "1" and to a B-side if it is "0".

An output side of the FIFO memory 131 is connected to a movable terminal of the transfer switch 134 via a delay circuit 135 for adjusting time. An A-side fixed terminal of this transfer switch 134 is connected to the input side of the suite that immediately follows the relevant route selection section $104_n$ and its B-side fixed terminal, to the output side of the suite that immediately follows the relevant route selection section $104_n$.

As described above, based on an address stored in the processing unit address portion in a process packet PPe output from the FIFO memory 131, the address decision section 133 decides whether a process related to this process packet PPe is to be executed by the operation processing unit $102_n$ included in the suite that immediately follows the relevant route selection section 104n. As described later, based on the decision signal $s_3$, which indicates a result of this decision, switching of the transfer switch 134 is controlled, to supply this process packet PPe to the input side or the output side of the suite that immediately follows the relevant route selection section $104_n$.

At least when the address decision section 133 makes a decision, contents stored in the processing unit address portion in a process packet PPe are already output from the FIFO memory 131, so that if the output side of the FIFO memory 131 is directly connected to the movable terminal of the transfer switch 134, such a case may occur that this process packet PPe cannot be output from this transfer switch 134 in a defect-free complete state.

The above-described time-adjusting delay circuit 135 is used to output this process packet PPe in the defect-free and complete state and so adapted to provide delay time at least from a moment when output of the process packet PPe from the FIFO memory 131 is started to a moment when decision results are given by the address decision section 133.

The following will describe operations of the route selection section $104_n$ shown in FIG. 8.

A process packet (input process packet) supplied via the data bus from the previous-stage process generation section 101 (or route selection section or operation processing unit) is taken into the FIFO memory 131 and stored temporarily in it. Then, the process packet PPe output from this FIFO memory 131 is supplied via the delay circuit 135 to the movable terminal of the transfer switch 134.

The address decision section 133 decides whether at least one of addresses stored in the address storage section 132 is present in address stored in the processing unit address portion (see FIG. 6) in an process packet PPe.

If a positive decision result is obtained, the address decision section 133 decides that a process related to this process packet PPe is to be executed by any one of the operation processing units $102_n$ included in the suite that immediately follows this route selection section $104_n$, to set the decision signal $s_3$ to "1". This causes the transfer switch 134 to be connected to the A-side, so that this process packet PPe is supplied through the A-side of the transfer switch 134 to the input side of the suite that immediately follows this route selection section $104_n$.

If a negative decision result is obtained, the address decision section 133 decides that the process related to this process packet PPe is to be executed by none of the operation processing units $102_n$ included in the suite that immediately follows this route selection section $104_n$, to set the decision signal $s_3$ to "0". This causes the transfer switch 134 to be connected to the B-side, so that this process packet PPe is supplied through the B-side of the transfer switch 134 to the output side of the suite that immediately follows this route selection section $104_n$.

The following will describe in detail the operation processing unit $102_n$. FIG. 9 shows a configuration of the operation processing unit $102_n$.

This operation processing unit $102_n$ is made up of a processing element (PE) 110 and a memory 120.

The PE 110 has an FIFO memories 111 and 112 and an operation section 113. The FIFO memories 111 and 112 and the operation section 113 are connected in series.

The FIFO memory 111 is arranged to hold a process packet (input process packet) supplied via the data bus from the precious-stage operation processing unit (or route selection section). This FIFO memory 111 takes in the input process packet as synchronized with a system clock signal supplied thereto to store it temporarily.

The FIFO memory 112 is arranged to hold a process packet to be input to the operation section 113. The FIFO memory 112, as synchronized with the system clock signal supplied thereto, takes in process packets PPa sequentially output from the FIFO memory 111 and store them temporarily.

The operation section 113 performs processing in accordance with instructions contained in process packets PPb sequentially output from the FIFO memory 112 and, based on results of the processing, alters these process packets to obtain a process packet PPc to be output. Further, this operation section 113 outputs a request signal $s_2$ that becomes a state, "1", for example, if it outputs this process packet PPc to be output and, otherwise, becomes the other state, "0", for example.

It is to be noted that the operation section 113 has at least such functions as to decode instructions contained in a process packet, execute the decoded instructions, generate process packets to be output, and output the process packets.

The operation section 113 decodes instructions contained in an input process packet PPb and, if they are executable, executes them. Based on results of the processing performed by executing the instructions, the operation section 113 alters the input process packet PPb to obtain a process packet PPc to be output and outputs it.

If the instructions are inexecutable, the operation section 113 makes the input process packet PPb as it is a process packet PPc to be output and outputs it.

Although the operation section 113 can execute instructions contained in an input process packet PPb, if the same process packet as this input process packet PPb has been input and its processing has been finished, the operation section 113 performs no processing on that input process packet PPb. This is because the input process packet PPb is unnecessary in this case.

The memory 120 is connected to the operation section 113 via the data bus. As necessary, the operation section 113 stores image data in the memory 120 or reads the image data from the memory 120. That is, instructions allocated to a process packet includes a write instruction that instructs to write image data and a read instruction that instructs to read image data.

If a process packet has a write instruction and image data in it, the operation section 113 supplies the image data via the data bus to the memory 120 and stores it there. If the process packet has a read instruction in it, on the other hand, the operation section 113 reads the image data via the data bus from the memory 120 and allocates it to the process packet.

It is to be noted that in the present embodiment, as shown in FIG. 9, the memory 120 has its storage region divided into five banks, so that image data of five fields can be stored in the different banks. However, the banks of the memory 120 each need not have a storage capacity enough to store one field of image data.

Figure 3:
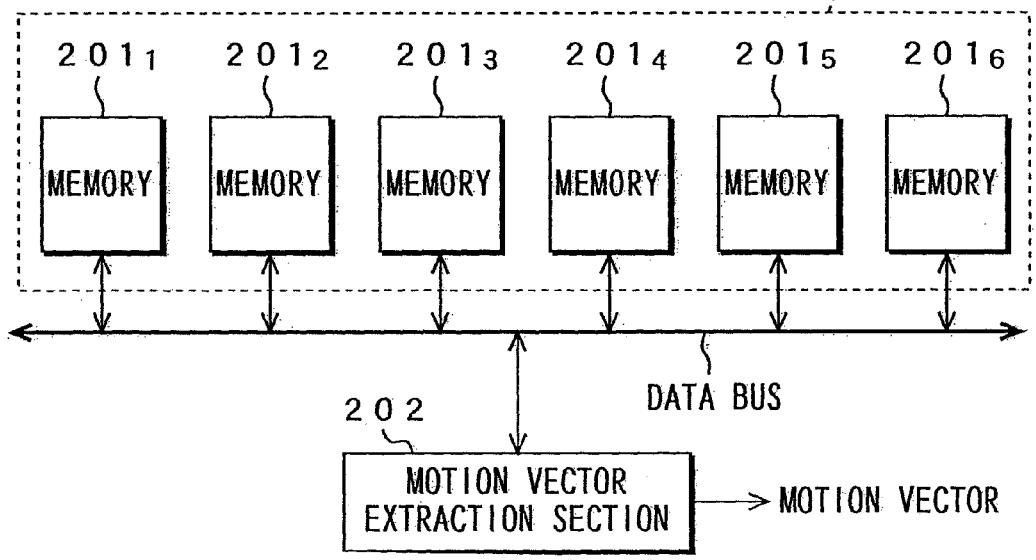
FIG. 3 is a block diagram for showing a configuration of one example of a conventional motion vector detection device.
Figure 4:
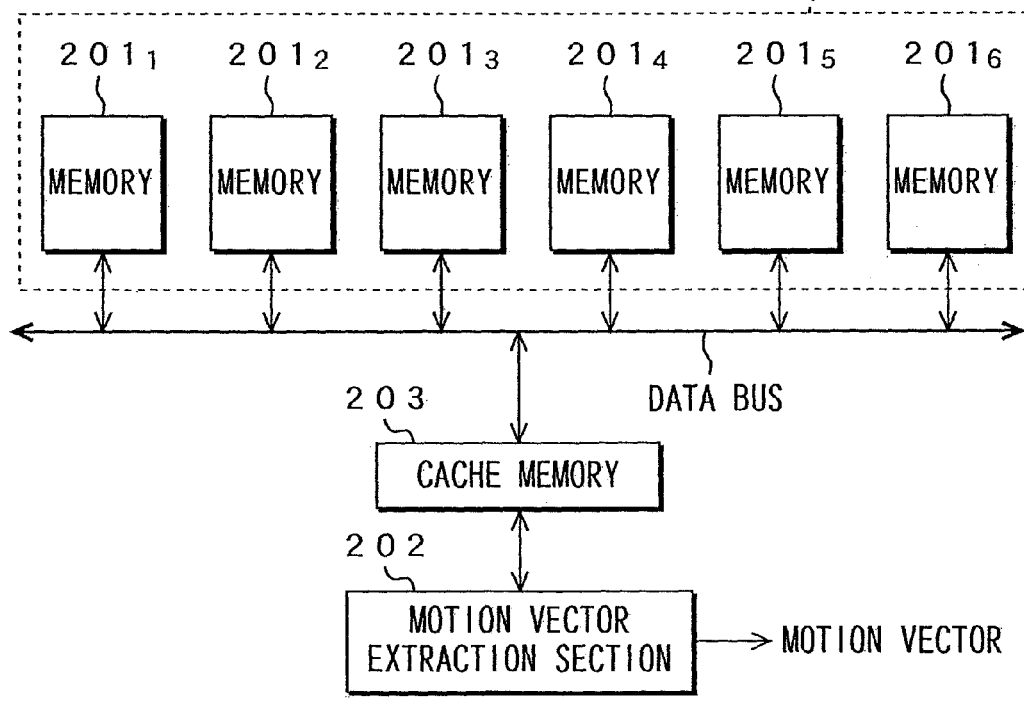
FIG. 4 is a block diagram for showing a configuration of another example of the conventional motion vector detection device.

In the present embodiment, each of the banks of the memory 120 only needs to have a storage capacity enough to store at least image data of a search range in total of the twelve operation processing units $102_1$-$102_{12}$. That is, in the present embodiment, a storage capacity 12 times that of each bank only needs to be at least an amount of image data of the search range. For example, each bank of the memory 120 is assigned a storage capacity to store a twelfth field of image data. Therefore, as the memory 120, such a memory can be employed as to have negligible wiring capacitance as illustrated with reference to FIG. 3, that is, such a memory as to have a relatively small storage capacity and enable shortening the data bus between itself and the PE 110.

Further, the PE 110 has an address storage section 114 and an address decision section 115. In the address storage section 114, an address of the operation processing unit $102_n$ itself, that is, its own address is stored beforehand.

The address decision section 115 decides whether a process related to a process packet PPa output from the FIFO memory 111 is to be executed by this operation processing unit $102_n$. That is, the address decision section 115 decides whether its own address in the address storage section 114 is present in one or a plurality of addresses stored in the processing unit address portion (see FIG. 6) in the process packet PPa output from the FIFO memory 111 and outputs a decision signal $s_1$ that becomes a state, "1", for example, if present and, becomes the other state, "0", for example.

The PE 110 further has a transfer switch 116 as switching means for selectively picking up either a process packet PPa output from the FIFO memory 111 or a process packet PPc output from the operation section 113 and a switchover control section 117 for controlling switching by this transfer switch 116.

An output side of the operation section 113 is connected to an A-side fixed terminal of the transfer switch 116 and the output side of the FIFO memory 111 is connected via a time-adjusting delay circuit 118 to a B-side fixed terminal of the transfer switch 116. Furthermore, an OFF-side fixed terminal of the transfer switch 116 is connected to a power supply terminal. That is, this OFF-side fixed terminal is in a state supplied with high-level data of "1". It is to be noted that this OFF-side fixed terminal may be connected to a ground so that it may be in a state supplied with low-level data of "0".

A movable terminal of the transfer switch 116 provides an output terminal of the operation processing unit $102_n$. That is, this movable terminal is connected via the data bus to the last-stage operation processing unit (or route selection section or add-up section).

As described above, based on an address stored in the processing unit address portion in a process packet PPa output from the FIFO memory 111, the address decision section 115 decides whether a process related to this process packet PPa is to be executed by this operation processing unit $102_n$.

As described later, if this process packet PPa is not to be executed by this operation processing unit $102_n$ and hence immediately output to the following stage via the transfer switch 116, at least when the address decision section makes a decision, contents stored in the processing unit address portion in this process packet PPa have been already output from the FIFO memory 131, so that if the output side of the FIFO memory 111 is directly connected to the B-side fixed terminal of the transfer switch 116, this process packet PPa cannot be supplied to the following stage in a defect-free and complete state.

The above-described time-adjusting delay circuit 118 is used to supply this process packet PPa to the following stage in the defect-free and complete state and so adapted to provide delay time at least from a moment when output of this process packet PPa from the FIFO memory 111 is started to a moment when decision results are given by the address decision section 115.

The switchover control section 117 is supplied with the request signal $s_2$ output from the operation processing section 113 and the decision signal $s_1$ output from the address decision section 115. If the request signal $s_2$ is "1", the switchover control section 117 conducts control so that the transfer switch 116 may be connected to the A-side regardless of whether the decision signal $s_1$ is "1" or "0". If the request signal $s_2$ is "0" and the decision signal $s_1$ is "0", it conducts control so that the transfer switch 116 may be connected to B-side. Further, if the request signal $s_2$ is "0" and the decision signal $s_1$ is "1", it conducts control so that the transfer switch 116 may be connected to the OFF side.

FIG. 10 shows switchover relationships among the decision signal $s_1$, the request signal $s_2$, and the transfer switch 116.

The following will describe operations of the operation processing unit $102_n$ shown in FIG. 9.

A process packet (input process packet) supplied via the data bus from the previous-stage operation processing unit (or route selection section) is taken into the FIFO memory 111 and stored temporarily in it. Then, the process packet PPa output from this FIFO memory 111 is taken into the FIFO memory 112 and stored in it temporarily. Further, the process packet PPa output from the FIFO memory 111 is supplied via the delay circuit 118 to the B-side fixed terminal of the transfer switch 116.

A process packet PPb sequentially output from the FIFO memory 112 is supplied to the operation section 113. The operation section 113 decodes instructions contained in the process packet PPb and, if the instructions are executable, it executes them. Based on results of the processing performed by executing the instructions, the operation section 113 alters the input process packet PPb to generate a process packet PPc to be output and outputs it. This process packet PPc is supplied to the A-side fixed terminal of the transfer switch 116.

If the instructions contained in the input process packet PPb are executable but the same process packet as this input process packet PPb has been input in the past and processing by use of it has been finished already, the operation section 113 performs no processing on this input process packet PPb. Whether these process packets are the same as each other can be decided on the basis of a PID allocated to the PID portion (see FIG. 6).

If the instructions are inexecutable, on the other hand, the operation section 113 makes the input process packet PPb as it is a process packet PPc to be output and outputs it.

The process packet PPc output from the operation section 113 is supplied to the A-side fixed terminal of the transfer switch 116. When the process packet PPc is output in such a manner, the operation section 113 sets the request signal $s_2$ to "1".

Further, the address decision section 115 decides whether its own address stored in the address storage section 114 is present in the addresses stored in the processing unit address portion in the process packet PPa.

In this case, when its own address is present in the addresses stored in the processing unit address portion, the address decision section 115 decides that a process related to the process packet PPa is to be executed by this operation processing unit $102_n$ and sets the decision signal $s_1$ to "1".

When its own address is not present in the addresses stored in the processing unit address portion, the address decision section 115 decides that the process related to the process packet PPa is not to be executed by this operation processing unit $102_n$ and sets the decision signal $s_1$ to "0".

The request signal $s_2$ output from the operation section 113 and the decision signal $s_1$ output from the address decision section 115 are supplied to the switchover control section 117. If the request signal $s_2$ is "1", the switchover control section 117 connected the transfer switch 116 to the A-side. That is, when the operation section 113 has finished processing of the process packet PPb to output the process packet PPc, the transfer switch 116 is connected to the A-side. In this case, the process packet PPc output from the operation section 113 is supplied via the A-side of the transfer switch 116 to the following-stage operation processing unit (or route selection section or add-up section) as an output process packet.

Further, if the request signal $s_2$ is "0" and the decision signal $s_1$ is "0", the switchover control section 117 connected the transfer switch 116 to the B-side. That is, when the operation section 113 is performing processing of the process packet PPb and if the process related to the process packet PPa output from the FIFO memory 111 is not to be executed by this operation processing unit $102_n$, the transfer switch 116 is connected to the B-side. In this case, that process packet PPa is immediately supplied via the B-side of the transfer switch 116 to the following-stage operation processing unit (or route selection section or add-up section) as an output process packet. It is thus possible to reduce the processing time.

Further, if the request signal $s_2$ is "0" and the decision signal $s_1$ is "1", the switchover control section connects the transfer switch 116 to the OFF side. That is, when the operation section 113 is performing processing of the process packet PPb and if the process related to the process packet PPa output from the FIFO memory 111 is to be executed by this operation processing unit $102_n$, the transfer switch 116 is connected to the OFF-side. In this case, the following-stage operation processing unit (or route selection section or add-up section) is supplied with high-level "1" or low-level "0" data. It is thus possible to prevent a wrong process packet, for example, process packet PPa output from the FIFO memory 111 (which packet PPa is necessary for being processed in the operation section 113 in this operation processing unit $102_n$, but has not been undergone by the processing) from being supplied to the following-stage operation processing unit (or route selection section or add-up section).

Figure 11:
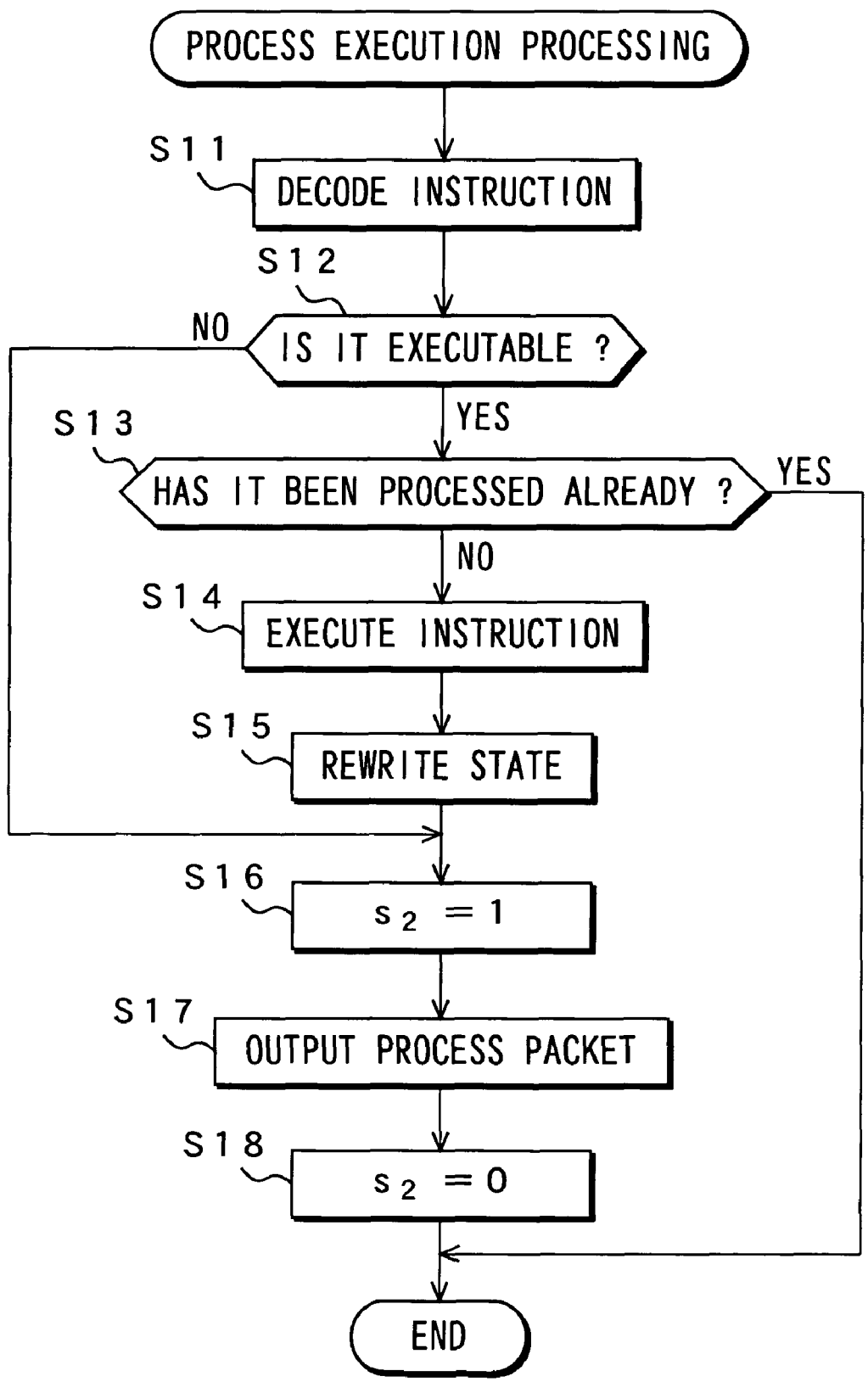
FIG. 11 is an explanatory flowchart of process execution processing by an operation section.

The following will describe processing (process execution processing) by the operation section 113 in the operation processing unit $102_n$ shown in FIG. 9 in a case where this operation section 113 is supplied with a process packet PPb, with reference to a flowchart of FIG. 11.

At step S11, the operation section 113 decodes instructions allocated to the input process packet PPb and the process goes to step S12. At step S12, the operation section 113 decides whether the instruction decoded at step S11 is executable.

If having decided at step S12 that the instruction is not executable, the operation section 113 skips steps S13-S15 and the process goes to step S16 where it sets the request signal $s_2$ to "1". At step S17, the operation section 113 makes the input process packet PPb as it is a process packet PPc to be output and outputs it and the process goes to step S18 where it returns the request signal $s_2$ to "0" to end the processing.

If having decided at step S12 that the instruction is executable, on the other hand, the process goes to step S13 where the operation section 113 decides whether the same process packet as this input process packet PPb has been input in the past and processed already. If the operation section 113 decides that it has been processed, it performs no processing on that input process packet PPb and ends the processing. In this case, the input process packet PPb is unnecessary, so that the operation section 113 will not output a process packet that corresponds to this input process packet PPb.

If having decided at step S13 that it has not yet been processed, the process goes to step S14 where the operation section 113 executes instruction allocated to the input process packet PPb and performs processing in accordance with the instruction. The operation section 113 allocates, as necessary, to the input process packet PPb data obtained by performing processing according to the instruction allocated in the process packet at step S14 and the process goes to step S15.

At step S15, the operation section 113 rewrites, as necessary, the state portion in the input process packet PPb in accordance with the processing it has performed at step S14 and the process goes to step S16.

At step S16, the operation section 113 sets the request signal $s_2$ to "1". At step S17, the operation section 113 makes the input process packet PPb altered at steps S14 and S15 a process packet PPc to be output and outputs it and then, at step S18, returns the request signal $s_2$ to "0" to end the processing.

Figure 12:
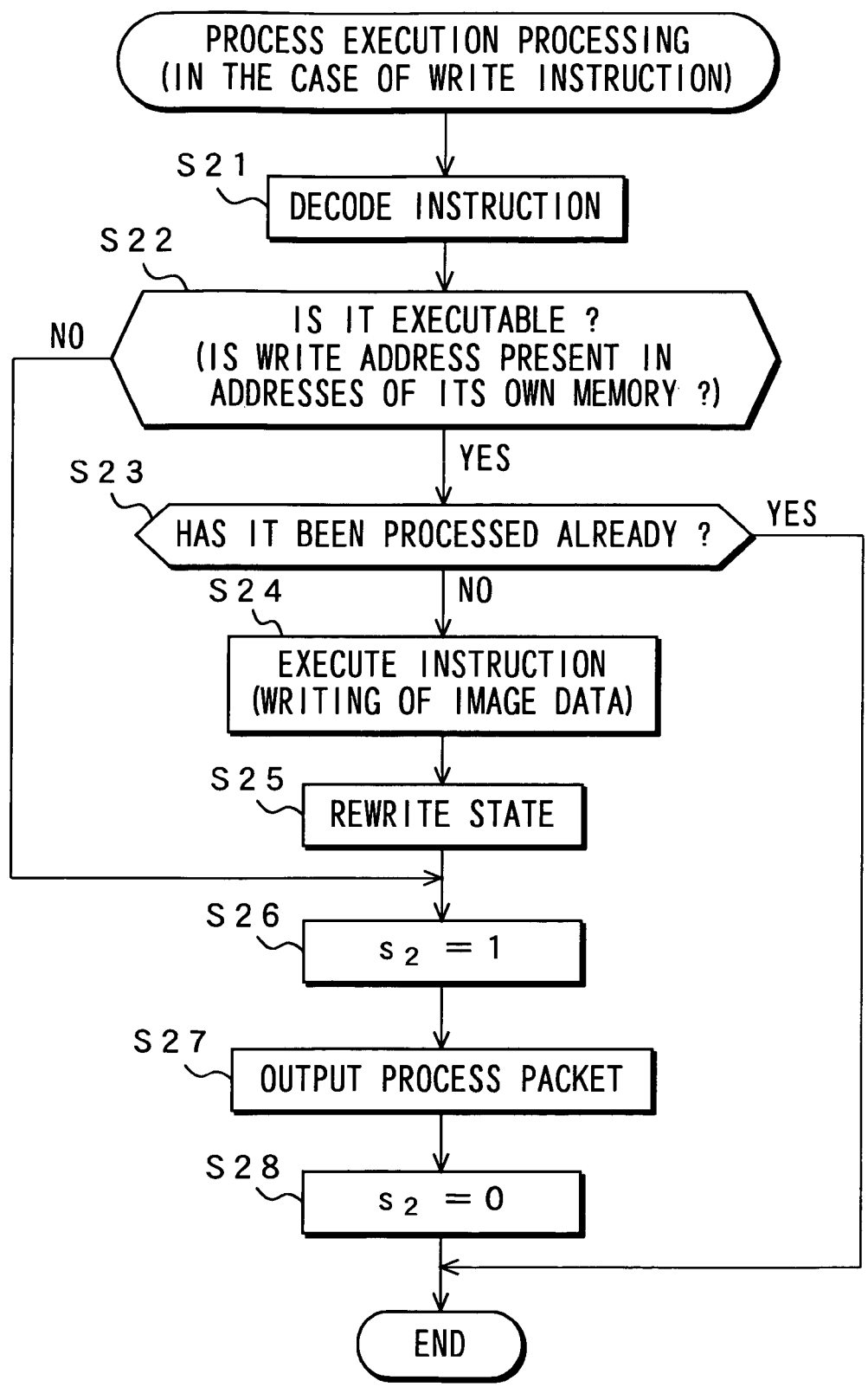
FIG. 12 is an explanatory flowchart of the process execution processing (in the case of a write instruction) by the operation section.

The following will describe processing (process execution processing) by the operation section 113 in the operation processing unit $102_n$ of FIG. 9 in a case where a process packet PPb having a write instruction is input to this operation section 113, with reference to a flowchart of FIG. 12.

In this case, it is supposed that in the input process packet PPb, besides the write instruction, at least image data to be written into the memory 120 and a write address in the memory 120 at which the image data is to be written are allocated.

At step S21, the operation section 113 decodes the instruction allocated to that input process packet PPb and the process goes to step S22. At step S22, the operation section 113 decides whether the instruction decoded at step S21 is executable, in this case, whether the write address allocated to the input process packet PPb is present in addresses in the memory $120_n$ that the operation processing unit $102_n$ has.

If having decided at step S22 that the write address allocated to the process packet is not present in the addresses in the memory $120_n$ that the operation processing unit $102_n$ has, the operation section 113 skips steps S22-S25 and the process goes to step S26 where it sets the request signal $s_2$ to "1". At step S27, the operation section 113 makes the input process packet PPb as it is a process packet PPc to be output and outputs it and the process goes to step S28 where it returns the request signal $s_2$ to "0" to end the processing.

If having decided at step S22 that the write address allocated to the process packet is present in the addresses in the memory $120_n$ that the operation processing unit $102_n$ has, the process goes to step S23 where the operation section 113 decides whether the same process packet as this input process packet PPb has been input in the past and processed already. If the operation section 113 decides that it has been processed, the operation section 113 performs no processing on that input process packet PPb and ends the processing. In this case, the input process packet PPb is unnecessary, so that the operation section 113 will not output a process packet that corresponds to this input process packet PPb.

If having decided at step S23 that it has not yet been processed, the process goes to step S24 where the operation section 113 executes the instruction allocated to the input process packet PPb. That is, the operation section 113 writes the image data allocated in the input process packet PPb into the memory $120_n$ and the process goes to step S25.

At step S25, the operation section 113 rewrites, as necessary, the state portion in the input process packet PPb in accordance with the processing it has performed at step 24 and the process goes to step S26.

At step S26, the operation section 113 sets the request signal $s_2$ to "1". At step S27, the operation section 113 makes the input process packet PPb altered at steps S24 and S25 a process packet PPc to be output and outputs it and then, at step S28, returns the request signal $s_2$ to "0" to end the processing.

The process generation section 101 generates and outputs a process packet having a write instruction (hereinafter referred to as "write process packet" appropriately) at steps S1-S3 of the process generation processing of FIG. 7. As this write process packet sequentially moves through the operation processing units $102_1$-$102_{12}$, the image data of at least a target block and a candidate block is written into the memory 120 as shown in, for example, FIGS. 13A and 13B.

Figure 13A:
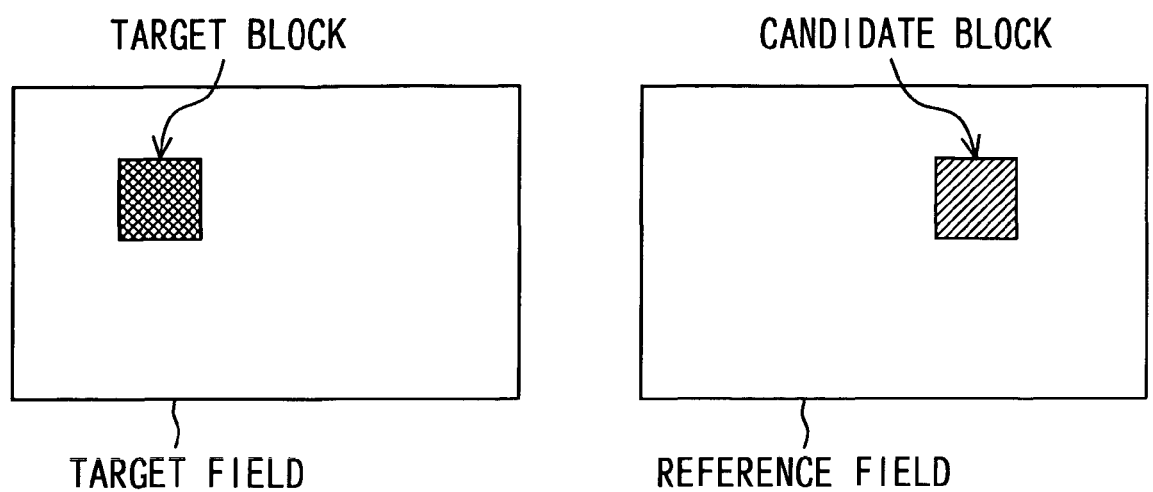
FIGS. 13A and 13B are diagrams each for showing states in which image data has been written to a memory.
Figure 13B:
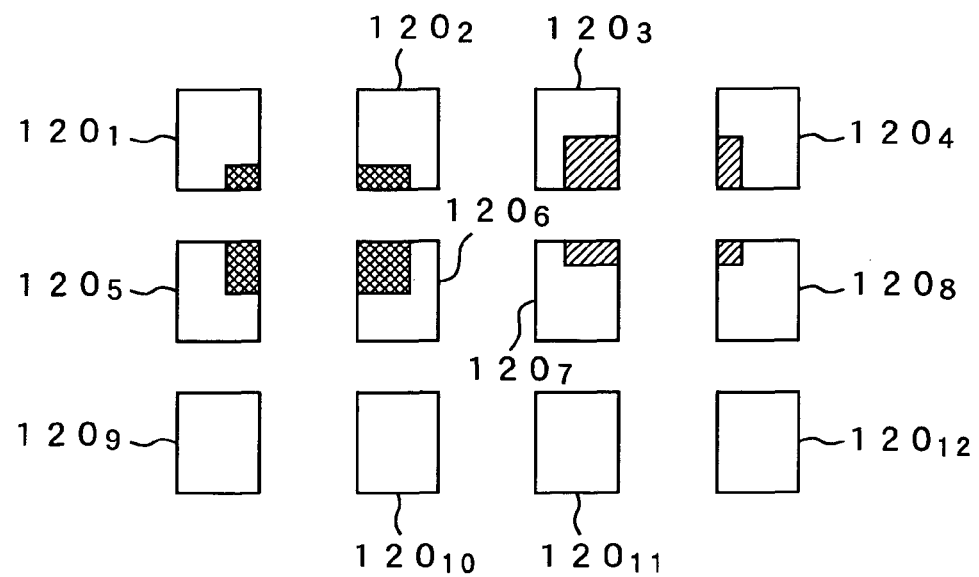

If the image data of the target block is cross-hatched and that of the candidate block is single-hatched as shown in FIG. 13A, in FIG. 13B, one portion of the target block is written into the memory $120_1$, another portion of it is written into the memory $120_2$, further another portion of its is written into the memory $120_5$, and the rest is written into the memory $120_6$ as well as one portion of the candidate block is written into the memory $120_3$, another portion of it is written into the memory $120_4$, further another portion of its is written into the memory $120_7$, and the rest is written into the memory $120_8$.

The following will describe processing (process execution processing) by the operation section 113 in the operation processing unit $102_n$ of FIG. 9 in a case where a process packet PPb having a read instruction is input to this operation section 113, with reference to a flowchart of FIG. 14.

In this case, it is supposed that in the input process packet PPb, besides the read instruction, at least a read address in the memory 120 from which the image data is to be read is allocated.

At step S31, the operation section 113 decodes the instruction allocated to that input process packet PPb and the process goes to step S32. At step S32, the operation section 113 decides whether the instruction decoded at step S31 is executable, in this case, whether the read address allocated to the input process packet PPb is present in addresses in the memory $120_n$ that the operation processing unit $102_n$ has.

If having decided at step S32 that the read address allocated to the process packet is not present in the addresses in the memory $120_n$ that the operation processing unit $102_n$ has, the operation section 113 skips steps S33-S35 and the process goes to step S36 where the operation section 113 sets the request signal $s_2$ to "1". At step S37, the operation section 113 makes the input process packet PPb as it is a process packet PPc to be output and outputs it and the process goes to step S38 where it returns the request signal $s_2$ to "0" to end the processing.

If having decided at step S32 that the read address allocated to the process packet is present in the addresses in the memory $120_n$ that the operation processing unit $102_n$ has, the process goes to step S33 where the operation section 113 decides whether the same process packet as this input process packet PPb has been input in the past and processed already. If the operation section 113 decides that it has been processed, the operation section 113 performs no processing on that input process packet PPb and ends the processing. In this case, the input process packet PPb is unnecessary, so that the operation section 113 will not output a process packet that corresponds to this input process packet PPb.

If the operation section 113 has decided at step S33 that it has not yet been processed, the process goes to step S34 where it executes the instruction allocated to the input process packet PPb. That is, the operation section 113 reads the image data from the memory $120_n$ and allocates the image data to the input process packet PPb and the process goes to step S35.

At step S35, the operation section 113 rewrites, as necessary, the state portion in the input process packet PPb in accordance with the processing it has performed at step S34 and the process goes to step S36.

At step S36, the operation section 113 sets the request signal $s_2$ to "1". At step S37, the operation section 113 makes the input process packet PPb altered at steps S34 and S35 a process packet PPc to be output and outputs it and then, at step S38, returns the request signal $s_2$ to "0" to end the processing.

Figure 15:
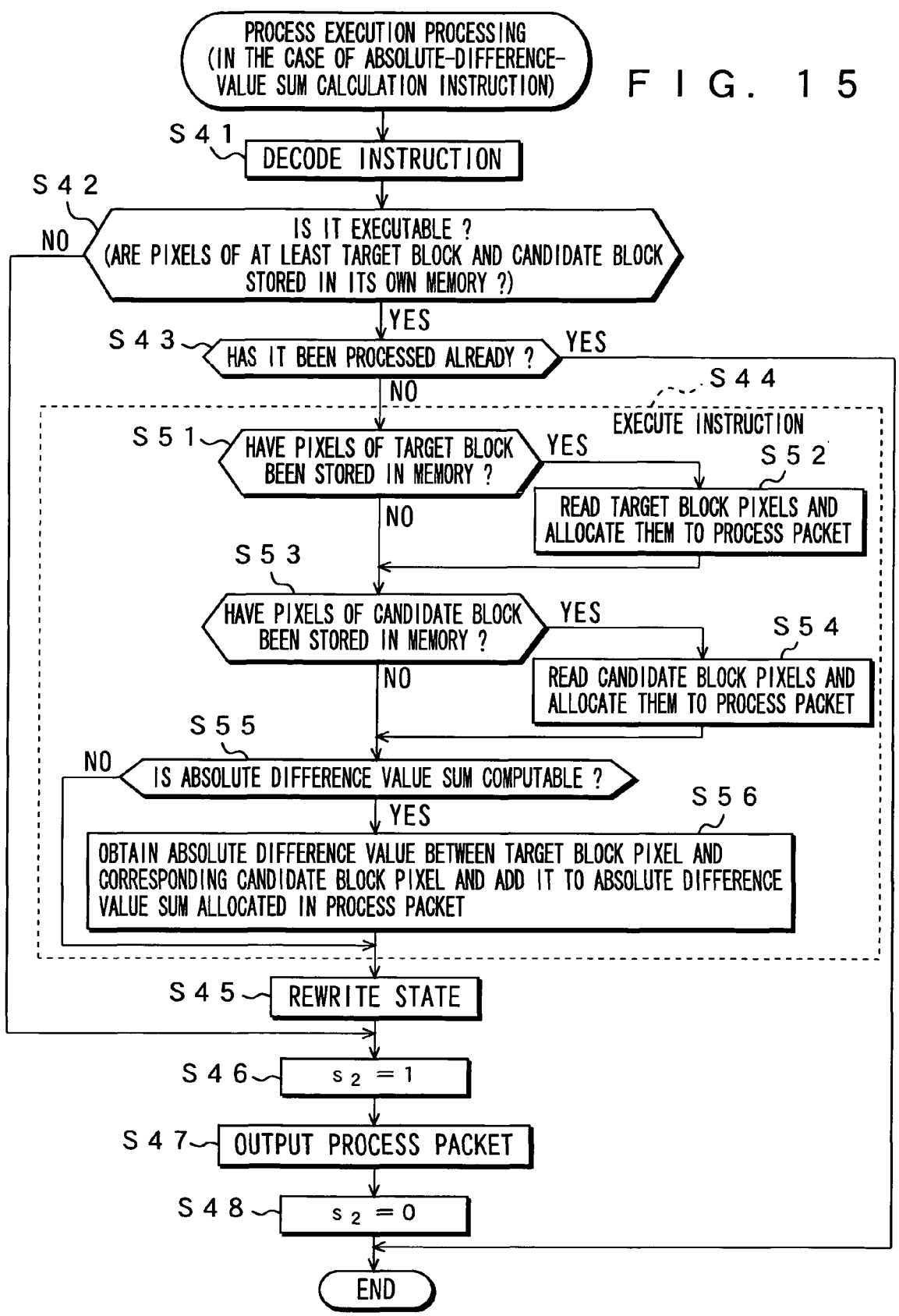
FIG. 15 is an explanatory flowchart of the process execution processing (in the case of an absolute-difference-value sum calculation instruction) by the operation section.

The following will describe processing (process execution processing) by the operation section 113 in the operation processing unit $102_n$ of FIG. 9 in a case where a process packet PPb having an absolute-difference-value sum calculation instruction is input into this operation section 113, with reference to a flowchart of FIG. 15.

In this case, it is supposed that at least image data of a target block and a candidate block on which an absolute-difference-value sum is calculated has already been written into the memory 120. Furthermore, it is supposed that in the input process packet PPb, besides the absolute-difference-value sum calculation instruction, at least addresses of the target block and the candidate block stored in the memory 120 and a candidate vector headed from the candidate block to the target block are allocated.

At step S41, the operation section 113 decodes the instruction allocated to that input process packet PPb and the process goes to step S42. At step S42, the operation section 113 decides whether the instruction decoded at step S41 is executable, in this case, whether pixels of at least one of the target block and the candidate block are stored in the memory $120_n$ that the operation processing unit $102_n$ has.

It is to be noted that whether the pixels of the target block are stored in the memory $120_n$ that the operation processing unit 102n has can be decided on the basis of the address of the target block that is allocated to the input process packet PPb. Whether the pixels of the candidate block are stored in the memory $120_n$ that the operation processing unit $102_n$ has can also be decided on the basis of the address of the candidate block that is allocated to the input process packet PPb.

If having decided at step S42 that neither the target block nor the candidate block is stored in the memory $120_n$ that the operation processing unit $102_n$ has, the operation section 113 skips steps S43-S45 ad the process goes to step S46 where it sets the request signal $s_2$ to "1". At step S47, the operation section 113 makes the input process packet PPb as it is a process packet PPc to be output and outputs it and the process goes to step S48 where the operation section 113 returns the request signal $s_2$ to "0" to end the processing.

If having decided at step S42 that the pixels of at least one of the target block and the candidate block are stored in the memory $120_n$ that the operation processing unit $102_n$ has, on the other hand, the process goes to step S43 where the operation section 113 decides whether the same process packet as this input process packet PPb has been input in the past and processed already. If the operation section 113 decides that it has been processed, the operation section 113 performs no processing on that input process packet PPb and ends the processing. In this case, the input process packet PPb is unnecessary, so that the operation section 113 will not output a process packet that corresponds to this input process packet PPb.

If having decided at step S43 that it has not yet been processed, on the other hand, the process goes to step S44 where the operation section 113 executes the instruction allocated to the input process packet PPb.

That is, at step S51, the operation section 113 first decides whether the pixels of the target block are stored in the memory $120_n$ that the operation processing unit $102_n$ has. If having decided at step S51 that the pixels of the target block are not stored in the memory $120_n$ that the operation processing unit $102_n$ has, the operation section 113 skips step S52 and the process goes to step S53.

If having decided at step S51 that the pixels of the target block are stored in the memory $120_n$ that the operation processing unit $102_n$ has, on the other hand, the process goes to step S52 where the operation section 113 reads the pixels of the target block stored in the memory $120_n$, and allocates them to the input process packet PPb, and the process goes to step S53.

At step S53, the operation section 113 decides whether the pixels of the candidate block are stored in the memory $120_n$ that the operation processing unit $102_n$ has. If having decided at step S53 that the pixels of the candidate block are not stored in the memory $120_n$ that the operation processing unit $102_n$ has, the operation section 113 skips step S54 and the process goes to step S55.

If having decided at step S53 that the pixels of the candidate block are stored in the memory $120_n$ that the operation processing unit $102_n$ has, on the other hand, the process goes to step S54 where the operation section 113 reads the pixels of the candidate block stored in the memory $120_n$, and allocates them to the input process packet PPb, and the process goes to step S55.

At step S55, the operation section 113 decides whether an absolute difference value sum can be calculated. In this case, the operation section 113 decides whether the calculation of the absolute difference value sum can be performed based on whether in the input process packet PPb, the pixels of the target block are allocated and also the pixels of the candidate block that corresponds to this target block are allocated.

If having decided at step S55 that the calculation of the absolute difference value sum is impossible, that is, if in the pixels of the target block are not allocated to the input process packet PPb or though the pixels of the target block are allocated, the pixels of the candidate block that corresponds to this target block are not allocated thereto, the operation section 113 skips step S56 to end execution of the absolute-difference-value sum calculation instruction and the process goes to step S45.

If having decided at step S55 that the calculation of the absolute difference value sum is possible, that is, if the pixels of the target block are allocated to the input process packet PPb as well as the pixels of the candidate block that corresponds to this target block are allocated to the input process packet PPb, on the other hand, the process goes to step S56 where the operation section 113 calculates an absolute difference value between each of the pixels of the target block allocated to the input process packet PPb and each of the pixels of the corresponding candidate block and also calculate a total sum of these values.

The operation section 113 adds up this total sum of these absolute difference values and an absolute difference value sum allocated to the absolute-difference-value sum portion in the input process packet PPb and overwrites it by the added value as a new absolute difference value sum in the absolute-difference-value sum portion in the input process packet PPb, to end execution of the absolute-difference-value sum calculation instruction and the process goes to step S45.

At step S45, the operation section 113 rewrites as necessary the state portion in the input process packet PPb in accordance with processing it has performed at step S44 and the process goes to S46.

At step S46, the operation section 113 sets the request signal $s_2$ to "1". At step S47, the operation section 113 makes the input process packet PPb altered at steps S44 and S45 a process packet PPc to be output and outputs it and then, at step S48, returns the request signal $s_2$ to "0" to end the processing.

At steps S4-S7 of the process generation processing of FIG. 7, the process generation section 101 generates and outputs a process packet (hereinafter referred to as "absolute-difference-value sum process packet" appropriately) that has an absolute-difference-value sum calculation instruction. This absolute-difference-value sum process packet moves through the operation processing units $102_1$-$102_{12}$, so that an absolute difference value sum between the target block and the candidate block is obtained as show in FIG. 16 and FIGS. 17A and 17B.

That is, it is supposed that as shown in FIG. 16, one portion of the target block is stored in the memory $120_n$, the rest of the target block and one portion of the candidate block are stored in the memory $120_n$, and the rest of the candidate block is stored in the memory $120_{n+2}$. It is to be noted that the PE 110 in the operation processing unit $102_n$ is referred to as "PE $110n$" appropriately.

In this case, when the operation processing unit $102_n$ has received a process packet, the PE $110_n$ reads the portion of the target block stored in the memory $120_n$, allocates it to the process packet, and transfers it to the following-stage operation processing unit $102_{n+1}$.

Figure 17A:
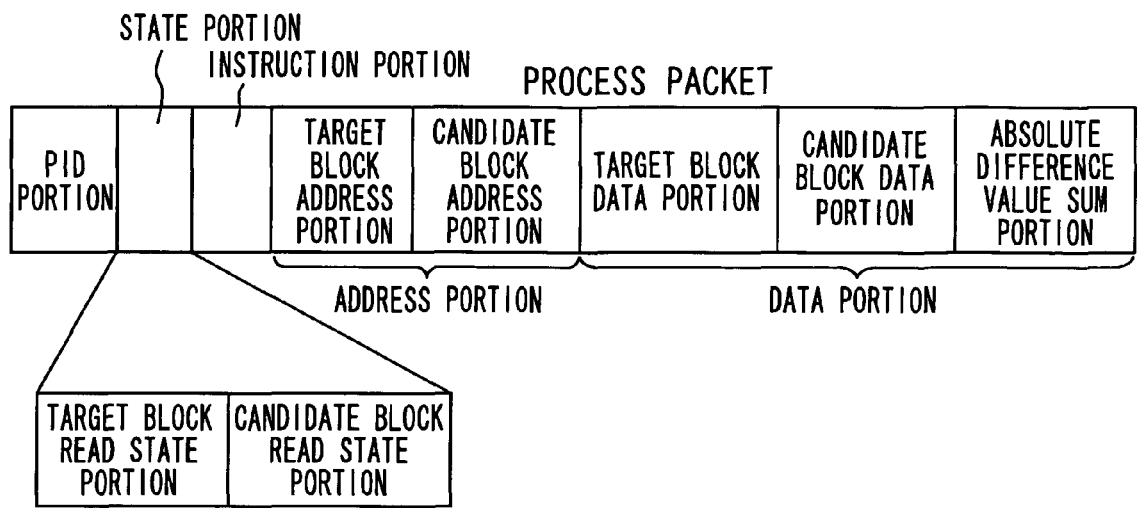
FIGS. 17A and 17B are diagrams each for showing alterations in process packet.
Figure 17B:
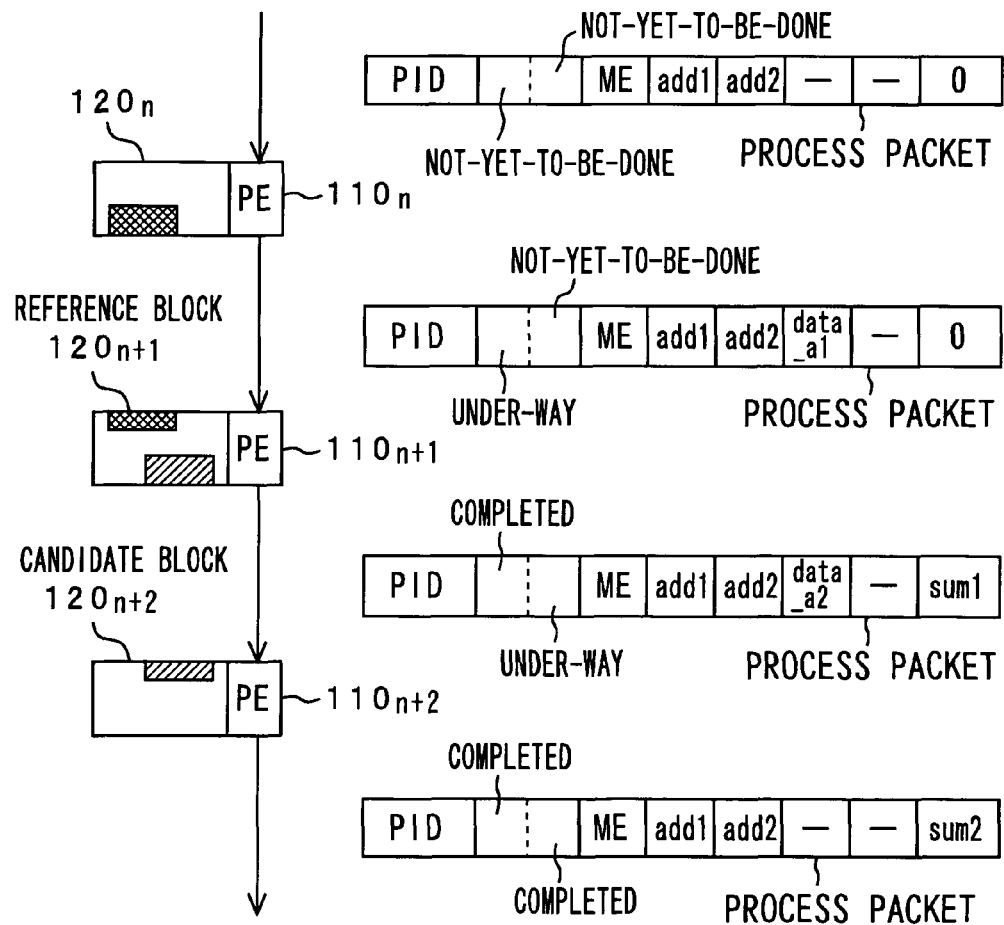

It is to be noted that the PE $110_n$ transmits and receives process packets shown in FIGS. 17A and 17B. For simplicity of illustrations of FIGS. 17A and 17B, as shown in FIG. 17A, only such components of the process packet are shown starting from the top as a PID portion, a target block read state portion, a candidate block read state portion, an instruction portion, a target block address portion, a candidate block address portion, a target block data portion, a candidate block data portion, and an absolute-difference-value sum portion.

As described with FIG. 16, the target block and the candidate block are stored in the memories $120_n$-$120_{n+2}$ and so neither of them is read before a process packet is received by the PE $110_n$, so that state information of the target block read state portion and that of the candidate block read state portion are both set to "not-yet-to-be-done". Furthermore, in this case, to the target block address portion and the candidate block address portion, address add1 of the target block and add2 of the candidate block are set respectively. Further, 0 is set as an initial value to the absolute difference value sum portion. It is to be noted that "ME" indicating an absolute-difference-value sum calculation instruction is set to the instruction portion.

By permitting such a process packet to be input to the PE $110_n$ and processed as described with FIG. 16, the following process packet is transferred from the PE $110_n$ to the PE $110_{n+1}$.

That is, to a process packet transferred from the PE $110_n$ to the PE $110_{n+1}$, a pixel, data_a1, of one portion of the target block stored in the memory $120_n$ as shown in FIG. 17B is newly allocated. Furthermore, at the PE $110_n$, since the pixel, data_a1, of one portion of the target block is read from the memory $120_n$, the state information of the target block read state portion in the process packet is rewritten from "not-yet-to-be-done" to "under-way".

When the operation processing unit $102_{n+1}$ has received the process packet from the operation processing unit $102_n$, the PE $110_{n+1}$ reads the rest of the target block and one portion of the candidate block stored in the memory $120_{n+1}$ as shown in FIG. 16. Since, in this case, the process packet from the operation processing unit $102_n$ has one portion of the target block in it, the PE $110_{n+1}$ acquires also pixels of the rest of the target block read from the memory $120_n$, and all the pixels of the entire target block.

The PE $110_{n+1}$ obtains a computable absolute difference value sum by using the pixels of the entire target block and some of the pixels of the candidate block read from the memory $120_{n+1}$ to allocate to the process packet. Further, the PE $110_{n+1}$ allocates pixels of the target block that have not been used in calculation of the absolute difference value sum to the process packet and transfers it to the following-stage operation processing unit $102_{n+2}$.

That is, to the process packet transferred from the PE $110_{n+1}$ to the PE $110_{n+2}$, such a pixel data_a2 of the target block pixels as not to have been used in calculation of the absolute difference value sum is allocated in place of the pixel data_a1 in the target block data portion as well as an absolute difference value sum sum1 obtained by the PE $110_{n+1}$ is allocated in place of the initial value 0 in the absolute difference value sum as shown in FIG. 17B. Furthermore, since the PE $110_{n+1}$ has acquired all the pixels of the target block as well as some of the pixels of the candidate block, the state information of the target block read state portion in the process packet is rewritten from "under-way" to "completed" and the state information of the candidate block read state portion is rewritten from "not-yet-to-be-done" to "under-way".

When the operation processing unit $102_{n+2}$ has received the process packet from the operation processing unit $102_{n+1}$, the PE $110_{n+2}$ reads the rest of the candidate block stored in the memory $120_{n+2}$ as shown in FIG. 16.

The PE $110_{n+2}$ obtains a computable absolute difference value sum by using the remaining pixels of the candidate block read from the memory $120_{n+2}$ and the pixels of the target block allocated to the process packet and adds it to the absolute difference value sum allocated to the process packet. The PE $110_{n+2}$ overwrites the process packet by an added value to allocate the value as a new absolute difference value sum to the process packet and transfers the packet to the following-stage operation processing unit $102_{n+3}$ (not shown). That is, since the PE $110_{n+2}$ acquires an absolute difference value sum, sum2, on all the pixels of the target block and those of the candidate block, to a process packet transferred from the PE $110_{n+2}$ to the PE $110_{n+3}$ (not shown), that absolute difference value sum, sum2, is allocated in place of the absolute difference value, sum1, in the absolute difference value sum portion as shown in FIG. 17B. Further, the pixels, data_a2, of the target block allocated to the target block data portion in the process packet are all used in calculation of an absolute difference value sum and so deleted from the target block data portion. Furthermore, since the remaining pixels of the candidate block have been acquired at the PE $110_{n+2}$, the state information of the candidate block read state portion in the process packet is rewritten from "under-way" to "completed".

In this case, at a moment when the process packet is output from the PE $110_{n+2}$, the absolute difference value sum, sum2, on all the pixels of the target block and the candidate block is allocated to this process packet. Therefore, the process packet is just transferred over from the operation processing units $102_{n+3}$ onward, until it is received by the add-up section 103 (see FIG. 5) finally.

The following will describe details of the add-up section 103. The add-up section 103 has the same configuration as the operation processing unit $102_n$. That is, the add-up section 103 is made up of the PE 110 and the memory 120. Although the add-up section 103 can be different in configuration from the operation processing unit $102_n$, preferably it has the same configuration as the operation processing unit $102_n$ to suppress costs in manufacturing of the motion vector detection device 100.

In the process generation section 101, an absolute-difference-value sum calculation process for calculating an absolute difference value sum for every candidate vectors selectable in a search range of a target block by using processing of steps S4-S6 in FIG. 7 is generated and if all the process packets that correspond to this process are received by the add-up section 103, the add-up section 103 acquires the absolute difference value sum for all of the candidate vectors selectable in the search range of the target block.

In the process generation section 101, after the processing of steps S4-S6 of FIG. 7, a minimum value decision process is generated by steps S7 and S8, to output a process packet containing a minimum value decision instruction. This process packet is received by the add-up section 103 via the operation processing units $102_1$-$102_{12}$. When having received the process packet containing the minimum value decision instruction, the add-up section 103 selects a process packet to which a minimum absolute difference value sum is allocated among the process packets, which correspond to the absolute-difference-value sum calculation process, that have been already received and outputs a candidate vector allocated in that process packet as a motion vector of the target block.

As described above, in the above embodiment, the plurality of operation processing units $102_n$ each of which is made up of the PE $110_n$ and the memory $120_n$ is connected one-dimensionally, over which units a process packet to which instructions and necessary data is allocated is transferred (moved) to perform processing to detect a motion vector, so that it is possible to avoid a problem that occurs when driving a long data bus, for example, an influence by wiring delay or by cross-talk or reflection between wiring lines.

That is, a short data bus is enough to connect the PE $110_n$ and the memory 120 to each other or to connect the operation processing units $102_n$ to each other, so that the problems involved in driving of a long data bus can be avoided. Therefore, it is unnecessary to take into account the problems involved in the driving of the long data bus when designing a motion vector detection device, so that a motion vector can be detected by easy-to-design hardware.

Further, in the above embodiment, the 12 operation processing units $102_1$-$102_{12}$ have been divided into the suites each of which comprises the consecutive four operation processing units, in such a configuration that the input sides of the suites 102a-102c are provided with the route selection sections $104_1$-$104_3$ inserted thereon respectively. If the operation processing unit $102_n$ which executes a process related to an input process packet is not included in the immediately following one of the suites 102a-102c, the respective route selection sections $104_1$-$104_3$ supply this corresponding input process packet not to the input side of that one of the suites 102a-102c but to the output side of that suite.

Therefore, the process packet moves through as bypassing such suites as not to include the operation processing unit $102_n$ that executes the process related to that process packet, thereby reducing processing time; moreover, useless movement of the process packet can be eliminated, thus reducing power dissipation.

Further, in the above embodiment, in the operation processing unit $102_n$ (see FIG. 9), when the operation section 113 is performing processing of the process packet PPb and if the process related to the process packet PPa output from the FIFO memory 111 is not to be executed by this operation processing unit $102_n$, the transfer switch 116 is connected to the B-side. Therefore, that process packet PPa is immediately supplied via the B-side of the transfer switch 116 to the following-stage operation processing unit (or route selection section or add-up section) as an output process packet, thereby enabling reducing the processing time.

Further, when the operation section 113 is performing processing of the process packet PPb and if the process related to the process packet PPa output from the FIFO memory 111 is to be executed by this operation processing unit $102_n$, the transfer switch 116 is connected to the OFF-side. In this case, the following-stage operation processing unit (or route selection section or add-up section) is supplied with high-level "1" or low-level "0" data. It is thus possible to prevent a wrong process packet, for example, process packet PPa output from the FIFO memory 111 from being supplied to the following stage.

Although in the above embodiment, the present invention has been applied to a motion vector detection device, the present invention can be applied similarly to any other image processing device for handling image data. For example, it can well be applied to a device that calculates image data differences in much the same way as the above-described motion vector detection device and, based on results of this difference calculation, searches a reference field for a predetermined image or character.

Further, the processing steps described along the flowcharts above need not always be processed in chronological order along these flowcharts but may comprise processing pieces (for example, parallel processing or object-based processing) that are performed concurrently or individually.

In a device according to the present invention for performing image processing by moving process data containing instructions required to execute processes for performing image processing over a plurality of series-connected execution means for executing the processes, route selection means is inserted on an input side of each of suites each of which comprises a predetermined number of the consecutive execution means so that if a process related to input process data is not to be executed by any one of the execution means that make up the immediately following suite, this input process data may be supplied to an output side of this immediately following suite, to reduce processing time and power dissipation.

Further, in a device according to the present invention for performing image processing by moving process data containing instructions required to execute processes for performing image processing over a plurality of series-connected execution means for executing the processes, any one of these execution means, if it is not to execute a process related to input process data, outputs this input process data as it is as output process data, thereby reducing the processing time.

PROBABILITY OF UTILIZED INDUSTRIALIZATION

As described above, an image processing device related to the present invention can reduce the processing time and the power dissipation and so could well be applied to such an application, etc. as to detect a motion vector by using, for example, the block matching method.

The invention claimed is:

1. An image processing device comprising:
process generation means for generating processes for performing image processing that handles image data and sequentially outputting process data containing instructions required to execute each of the processes;
a plurality of series-connected execution means each of which executes a process related to the process data, wherein the process data contains an address of the execution means for executing the process related to the process data,
    wherein the plurality of series-connected execution means are divided into a plurality of suites, each of the plurality of suites including a predetermined number of the series-connected execution means; and
a plurality of route selection means for selecting any one of the input side and an output side of each of the suites to supply the input process data, each of the plurality of route selection means being inserted to an input side of each of the plurality of suites, respectively;
wherein each of the plurality of route selection means comprises:
    first address storage means for storing an address of each of the plurality of execution means that make up the immediately following suite;
    first address decision means for outputs a decision signal that indicates a first state if at least one of addresses stored in the first address storage means is present among the addresses of the execution means that are contained in the input process data; and
    first switching means for supplying, depending on the decision signal output from the first address decision means, the input process data to the input side of the immediately following one of the suites if the decision signal indicates the first state and, otherwise, to the output side of this immediately following one of the suites.

2. The image processing device according to claim 1, wherein each of the plurality of execution means comprises:
    processing means for performing processing of image data in accordance with each of the instructions contained in the input process data, altering the input process data to obtain process data to be output based on a result of the processing, and outputting a request signal that becomes a second state when the process data to be output is output;
    second address storage means for storing an address of itself;
    second address decision means for outputting a decision signal that indicates a the first state if the address of itself stored in the second address storage means is present among the addresses of the execution means contained in the input process data; and
    second switching means for outputting, depending on the decision signal output from the second address decision means and the request signal output from the processing means, the process data to be output obtained by the processing means as output process data if the request signal is the second state and the input process data as the output process data if the request signal is not the second state and the decision signal is not the first state.

3. The image processing device according to claim 2, wherein each of the plurality of execution means further comprises data storage means for storing image data; and
    wherein the processing means performs as the image data processing any one of writing of image data to the data storage means, reading of the image data from the data storage means, and calculation of a difference on the image data.

4. The image processing device according to claim 2, wherein the second switching means outputs any one of high-level data and low-level data if the request signal is not the second state and the decision signal is the first state.

5. The image processing device according to claim 1, wherein the image processing includes detection of a motion vector.

6. An image processing device comprising:

process generation means for generating processes for performing image processing that handles image data and sequentially outputting process data containing instructions required to execute each of the processes; and a plurality of series-connected execution means each of which executes a process related to the process data wherein the process data contains an address of the execution means for executing the process related to the process data, wherein each of the plurality of execution means comprises:

processing means for performing processing of image data in accordance with the instructions contained in the input process data, altering the input process data to obtain process data to be output based on a result of the processing, and outputting a request signal that indicates a second state when the process data to be output is output;

address storage means for storing an address of itself;

address decision means for outputting a decision signal that indicates a first state if the address of itself stored in the address storage means is present among the addresses of the execution means contained in the input process data; and switching means for outputting, depending on the decision signal output from the address decision means and the request signal output from the processing means, the process data to be output obtained by the processing means as output process data if the request signal is the second state, and the input process data as the output process data if the request signal is not the second state and the decision signal is not the first state.

7. The image processing device according to claim 6, wherein each of the plurality of execution means further comprises data storage means for storing image data; and wherein the processing means performs as the image data processing any one of writing of image data to the data storage means, reading of the image data from the data storage means, and calculation of a difference on the image data.

8. The image processing device according to claim 6, wherein the switching means outputs any one of high-level data and low-level data if the request signal is not the second state and the decision signal is the first state.

9. The image processing device according to claim 6, wherein the image processing includes detection of a motion vector.

* * * * *